(12) United States Patent
Luo et al.

(10) Patent No.: US 8,796,392 B2
(45) Date of Patent: *Aug. 5, 2014

(54) LOW TEMPERATURE INJECTION MOLDING OF POLYARYLENE SULFIDE COMPOSITIONS

(71) Applicant: Ticona LLC, Florence, KY (US)

(72) Inventors: Rong Luo, Florence, KY (US); Xinyu Zhao, Cincinnati, OH (US)

(73) Assignee: Ticona LLC, Florence, KY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/709,152

(22) Filed: Dec. 10, 2012

(65) Prior Publication Data

US 2013/0158212 A1    Jun. 20, 2013

Related U.S. Application Data

(60) Provisional application No. 61/576,422, filed on Dec. 16, 2011.

(51) Int. Cl.
*C08G 69/32* (2006.01)
*C08G 75/04* (2006.01)

(52) U.S. Cl.
USPC ............................. 525/420; 525/537

(58) Field of Classification Search
USPC ...................................... 525/537
See application file for complete search history.

(56) References Cited

U.S. PATENT DOCUMENTS

| | | | |
|---|---|---|---|
| 4,511,709 A | 4/1985 | Yoo et al. | |
| 4,690,972 A | 9/1987 | Johnson et al. | |
| 4,791,187 A | 12/1988 | Siiling et al. | |
| 4,933,386 A * | 6/1990 | Nitoh et al. | 524/127 |
| 4,952,662 A | 8/1990 | Finke et al. | |
| 5,028,644 A | 7/1991 | Heinz et al. | |
| 5,057,264 A * | 10/1991 | Bier et al. | 264/328.1 |
| 5,063,184 A | 11/1991 | Tsuyoshi et al. | |
| 5,128,401 A * | 7/1992 | Heinz et al. | 524/342 |
| 5,151,458 A | 9/1992 | Heinz et al. | |
| 5,155,176 A | 10/1992 | Bagrodia et al. | |
| 5,252,656 A | 10/1993 | Nonaka et al. | |
| 5,258,442 A | 11/1993 | Kato et al. | |
| 5,258,450 A | 11/1993 | Nakata et al. | |

(Continued)

FOREIGN PATENT DOCUMENTS

| | | |
|---|---|---|
| EP | 0 055 480 A1 | 7/1982 |
| EP | 0 336 557 A1 | 10/1989 |

(Continued)

OTHER PUBLICATIONS

Machine Translation of JP 10-120902.*

(Continued)

*Primary Examiner* — Mike M Dollinger
(74) *Attorney, Agent, or Firm* — Dority & Manning, P.A.

(57) ABSTRACT

A method for injection molding a thermoplastic composition that contains a polyarylene sulfide and an aromatic amide oligomer is provided. Due to the improved crystallization properties imparted by the oligomer, the present inventors have discovered that the thermoplastic composition can be molded at lower temperatures to still achieve the same degree of crystallization. In addition to minimizing the energy requirements for the molding operation, such low mold temperatures may be accomplished using heating mediums that are less corrosive and expensive than some conventional techniques.

22 Claims, 4 Drawing Sheets

(56) References Cited

U.S. PATENT DOCUMENTS

| | | | |
|---|---|---|---|
| 5,340,861 A | 8/1994 | Chen et al. | |
| 5,488,084 A | 1/1996 | Kadoi et al. | |
| 5,500,471 A | 3/1996 | Uota | |
| 5,578,659 A | 11/1996 | Anada et al. | |
| 5,589,524 A | 12/1996 | Ogita et al. | |
| 5,599,864 A | 2/1997 | Ogawa et al. | |
| 5,646,202 A | 7/1997 | Schleicher et al. | |
| 5,705,550 A | 1/1998 | Nakagawa | |
| 5,733,962 A | 3/1998 | Osako et al. | |
| 5,854,155 A | 12/1998 | Kawasaki et al. | |
| 6,316,536 B1 | 11/2001 | Okamoto et al. | |
| 6,319,602 B1 | 11/2001 | Fauzi et al. | |
| 6,605,660 B2 | 8/2003 | Nakamura et al. | |
| 6,660,241 B2 | 12/2003 | Clere et al. | |
| 6,713,088 B2 | 3/2004 | Lodyga et al. | |
| 6,762,229 B2 * | 7/2004 | Nishihata et al. | 524/233 |
| 6,764,975 B1 | 7/2004 | Clere | |
| 6,787,631 B2 | 9/2004 | Shiraishi et al. | |
| 6,951,583 B2 | 10/2005 | Clere et al. | |
| 7,445,797 B2 | 11/2008 | Meneghetti et al. | |
| 7,524,560 B2 | 4/2009 | Paisner et al. | |
| 7,527,859 B2 | 5/2009 | Zhong et al. | |
| 7,569,635 B2 * | 8/2009 | Kojima et al. | 524/494 |
| 7,662,324 B2 | 2/2010 | Pruss et al. | |
| 7,960,602 B2 | 6/2011 | Thierauf et al. | |
| 7,974,660 B2 | 7/2011 | Hsu et al. | |
| 7,976,941 B2 | 7/2011 | Lodyga et al. | |
| 8,044,142 B2 | 10/2011 | Akiyama et al. | |
| 8,142,899 B2 | 3/2012 | Yoshino | |
| 8,258,346 B2 | 9/2012 | Rajendran | |
| 8,288,466 B2 | 10/2012 | Lin et al. | |
| 8,357,737 B2 | 1/2013 | Tanaka et al. | |
| 8,487,042 B2 | 7/2013 | Okubo et al. | |
| 2001/0047053 A1 | 11/2001 | Okamoto et al. | |
| 2002/0161089 A1 | 10/2002 | Nagatoshi et al. | |
| 2002/0161172 A1 | 10/2002 | Okamoto et al. | |
| 2002/0188096 A1 | 12/2002 | Tsubokura et al. | |
| 2003/0181560 A1 | 9/2003 | Kawaguchi et al. | |
| 2009/0003885 A1 * | 1/2009 | Sabu et al. | 399/252 |
| 2009/0111950 A1 | 4/2009 | Yamazaki et al. | |
| 2010/0048777 A1 | 2/2010 | Kodama et al. | |
| 2011/0134012 A1 | 6/2011 | Yang et al. | |
| 2013/0155597 A1 | 6/2013 | Luo et al. | |
| 2013/0156565 A1 | 6/2013 | Feng et al. | |
| 2013/0157033 A1 | 6/2013 | Luo et al. | |
| 2013/0158179 A1 | 6/2013 | Feng et al. | |

FOREIGN PATENT DOCUMENTS

| | | | |
|---|---|---|---|
| EP | 0 440 429 A2 | 8/1991 | |
| EP | 0 852 249 A1 | 7/1998 | |
| EP | 0 950 691 A1 | 10/1999 | |
| JP | 10120902 A * | 5/1998 | C08L 81/02 |
| WO | 2008/042446 A2 | 4/2008 | |
| WO | 2013/090172 A1 | 6/2013 | |

OTHER PUBLICATIONS

Machine Translation of JP 08333513.*
Abstract of German Patent—DE2041773, Feb. 14, 1972, 1 page.
Abstract of German Patent—DE3806836, Sep. 14, 1989, 1 page.
Abstract of European Patent—EP0405269, Jan. 2, 1991, 1 page.
Abstract of European Patent—EP0518022, Dec. 16, 1992, 1 page.
Abstract of European Patent—EP0523326, Jan. 20, 1993, 1 page.
Abstract of Japanese Patent—JPS57135859, Aug. 21, 1982, 2 pages.
Abstract of Japanese Patent—JPS5861146, Apr. 12, 1983, 1 page.
Abstract of Japanese Patent—JPS5893718, Jun. 3, 1983, 2 pages.
Abstract of Japanese Patent—JPS5867752, Apr. 22, 1983 1 page.
Abstract of Japanese Patent—JPS58219233, Dec. 20, 1983, 2 pages.
Abstract of Japanese Patent—JPS59196364, Nov. 7, 1984, 2 pages.
Abstract of Japanese Patent—JPS6049026, Mar. 18, 1985, 2 pages.
Abstract of Japanese Patent—JPS6227459, Feb. 5, 1987, 2 pages.
Abstract of Japanese Patent—JPS6454066, Mar. 1, 1989, 1 page.
Abstract of Japanese Patent—JPH01225660, Sep. 8, 1989, 2 pages.
Abstract of Japanese Patent—JPH02225565, Sep. 7, 1990, 2 pages.
Abstract of Japanese Patent—JPH0345655, Feb. 27, 1991, 1 page.
Abstract of Japanese Patent—JPH0350265, Mar. 4, 1991, 1 page.
Abstract of Japanese Patent—JPH0441561, Feb. 12, 1992, 2 pages.
Abstract of Japanese Patent—JPH04103665, Apr. 6, 1992, 2 pages.
Abstract of Japanese Patent—JPH04198266, Jul. 17, 1992, 1 page.
Abstract of Japanese Patent—JPH04202362, Jul. 23, 1992, 1 page.
Abstract of Japanese Patent—JPH04202363, Jul. 23, 1992, 2 pages.
Abstract of Japanese Patent—JPH04239560, Aug. 27, 1992, 2 pages.
Abstract of Japanese Patent—JPH05140451, Jun. 8, 1993, 1 page.
Abstract of Japanese Patent—JPH05194849, Aug. 3, 1993, 1 page.
Abstract of Japanese Patent—JPH06166817, Jun. 14, 1994, 1 page.
Abstract of Japanese Patent—JPH07228778, Aug. 29, 1995, 1 page.
Abstract of Japanese Patent—JPH07292056, Nov. 7, 1995, 1 page.
Abstract of Japanese Patent—JPH07330877, Dec. 19, 1995, 2 pages.
Abstract of Japanese Patent—JPH08157716, Jun. 18, 1996, 2 pages.
Abstract of Japanese Patent—JPH08176436, Jul. 9, 1996, 2 pages.
Abstract of Japanese Patent—JPH08245806, Sep. 24, 1996, 2 pages.
Abstract of Japanese Patent—JPH08333513, Dec. 17, 1996, 1 page.
Abstract of Japanese Patent—JPH093327, Jan. 7, 1997, 2 pages.
Abstract of Japanese Patent—JPH10292114, Nov. 9, 1998, 1 page.
Abstract of Japanese Patent—JPH10310699, Nov. 24, 1998, 1 page.
Abstract of Japanese Patent—JP2001348479, Dec. 18, 2001, 1 page.
Abstract of Japanese Patent—JP2002129015, May 9, 2002, 1 page.
Abstract of Japanese Patent—JP2006225613, Aug. 31, 2006, 2 pages.
Abstract of Japanese Patent—JP2006225644, Aug. 31, 2006, 1 page.
Abstract of Japanese Patent—JP2007051270, Mar. 1, 2007, 1 page.
Abstract of Japanese Patent—JP2007070587, Mar. 22, 2007, 1 page.
Abstract of Japanese Patent—JP2007106949, Apr. 26, 2007, 1 page.
Abstract of Japanese Patent—JP2007106950, Apr. 26, 2007, 1 page.
Abstract of Japanese Patent—JP2007153992, Jun. 21, 2007, 2 pages.
Abstract of Japanese Patent—JP2011068813, Apr. 7, 2011, 1 page.
Abstract of Japanese Patent—JP2011132344, Jul. 7, 2011, 1 page.
Abstract of Polish Patent—PL92807, 1977, 1 page.
Abstract of WO Patent—WO 2009/125556, Oct. 5, 2009, 1 page.
Abstract of Article—Shaul M. Aharoni, "Hydrogen-Bonded Highly Regular Strictly Alternating Aliphatic-Aromatic Liquid Crystalline Poly(ester amides)," *Macromolecules*, Vo. 21, 1988, pp. 1941-1961.
Article—Leung et al., "Development of Thermally Conductive and Electrically Insulating Polymer Composites for Electronic Packaging Applications," *ANTEC*, Annual Technical Conference Proceedings, Sponsored by Society of Plastics Engineers, May 1-5, 2011, pp. 504-510.
Article—Nohara et al, "Study of crystalline behavior of poly (phenylene sulfide), " *Polimeros*, vol. 16, No. 2, São Carlos Abr./Jun. 2006, 12 pages.
Article—Mai et al., "Nonisothermal Crystallization of Poly(phenylene sulfide) in Presence of Molten State of Crystalline Polyamide 6," *Journal of Applied Polymer Science*, vol. 74, 1999, pp. 3033-3039.
Article—Song et al., "Crystallization Kinetics and Nucleating Agents for Enhancing the Crystallization of Poly(p-Phenylene Sulfide)," *Polymer Engineering and Science*, vol. 30, No. 16, Aug. 1990, pp. 944-949.
Article—Ueda et al., "Synthesis of Sequential Polyamide by Direct Polycondensation," *Polymer Journal*, vol. 23, No. 3, 1991, pp. 167-176.
Article—Zhang et al., "Effect of a polyaryletherketone-bearing bulky substituent on the non-isothermal crystallization kinetics of polyphenylene sulfide," *Thermochimica Acta*, vol. 257, 1995, pp. 183-188.
Article—"Boron nitride finds new applications in thermoplastic compounds," *Plastics Additives and Compounding*, May/Jun. 2008, pp. 26-31.
Momentive Performance Materials and Material Safety Data Sheet for PolarTherm® Boron Nitride Powder Grade PT110, 9 pages, 2006-2007, 2010.
Momentive Performance Materials and Material Safety Data Sheet for PolarTherm® Boron Nitride Filler PT120, 8 pages, 2006-2007, 2010.

(56) References Cited

OTHER PUBLICATIONS

Momentive Performance Materials and Material Safety Data Sheet for PolarTherm® Boron Nitride Filler PT180, 8 pages, 2006-2007, 2010.

Technical Information No. CAT-0001, Sep. 2003, Denka Boron Nitride, Seongha Trading Co., Ltd., 4 pages.

Product Data Sheet on Combat® Boron Nitride Industrial Powders, Saint-Gobain Advanced Ceramics, 2005, 1 page.

DENKA Product Information, Denka Boron Nitride, 1 page.

DENKA Product Information, Denka Boron Nitride, Powder, 2005, 2 pages.

Search Report and Written Opinion for PCT/US2012/068694 dated Mar. 20, 2013, 10 pages.

* cited by examiner

US 8,796,392 B2

LOW TEMPERATURE INJECTION MOLDING OF POLYARYLENE SULFIDE COMPOSITIONS

RELATED APPLICATIONS

This application claims filing benefit of U.S. Provisional Patent Application Ser. No. 61/576,422 filed on Dec. 16, 2011, which is incorporated herein in its entirety.

BACKGROUND OF THE INVENTION

Polyphenylene sulfide ("PPS") is a high performance polymer that can withstand high thermal, chemical, and mechanical stresses. Due to its relatively slow crystallization rate, however, injection molding of parts from polyphenylene sulfide can be challenging. For example, to achieve the desired degree of crystallization, molding is generally conducted at a high mold temperature (~130° C. or more) and for a relatively long cycle time. Unfortunately, high mold temperatures typically dictate the need for expensive and corrosive cooling mediums (e.g., oils) in order to achieve good mechanical properties. Attempts to address the problems noted above have generally involved the inclusion of various additives in the polymer composition to help improve its crystallization properties. To date, however, such attempts have not been fully satisfactory. As such, a need exists for a suitable method for injection molding polyarylene sulfide at low temperatures while still achieving good mechanical properties.

SUMMARY OF THE INVENTION

In accordance with one embodiment of the present invention, a method for injection molding a thermoplastic composition is disclosed. The method comprises injecting a thermoplastic composition into a mold cavity, wherein the thermoplastic composition comprises a polyarylene sulfide and aromatic amide oligomer; cooling the thermoplastic composition within the mold cavity at a mold temperature of from about 50° C. to about 120° C.; and ejecting the molded part from the mold cavity.

Other features and aspects of the present invention are set forth in greater detail below.

BRIEF DESCRIPTION OF THE FIGURES

A full and enabling disclosure of the present invention, including the best mode thereof to one skilled in the art, is set forth more particularly in the remainder of the specification, including reference to the accompanying figures, in which.

DETAILED DESCRIPTION

Figure 1:
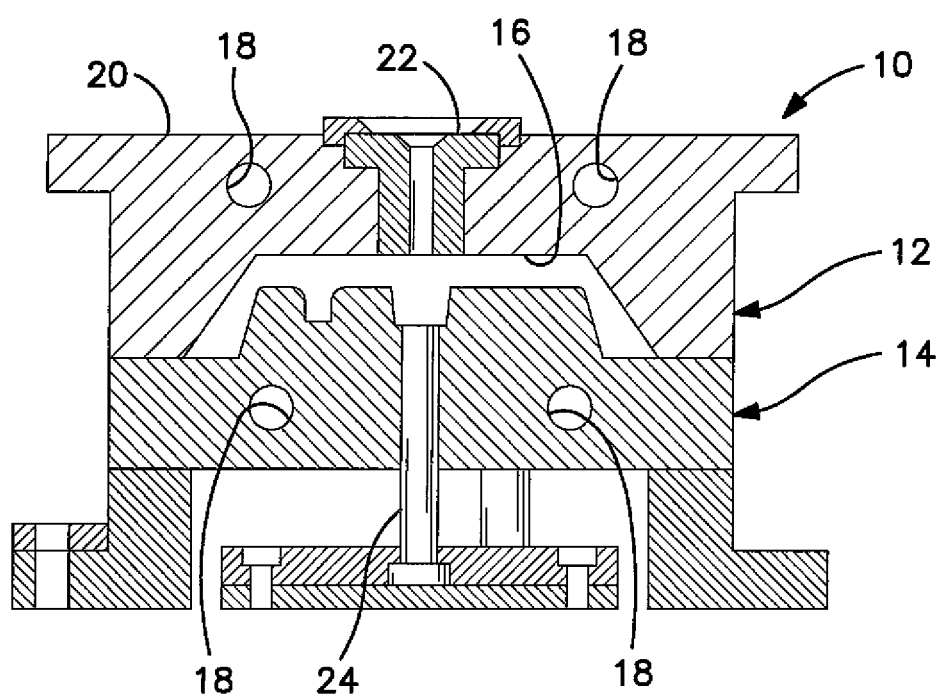
FIG. 1 is a cross-sectional view of one embodiment of an injection mold apparatus that may be employed in the present invention.

It is to be understood that the terminology used herein is for the purpose of describing particular embodiments only and is not intended to limit the scope of the present invention.

"Alkyl" refers to monovalent saturated aliphatic hydrocarbyl groups having from 1 to 10 carbon atoms and, in some embodiments, from 1 to 6 carbon atoms. "$C_{x-y}$alkyl" refers to alkyl groups having from x to y carbon atoms. This term includes, by way of example, linear and branched hydrocarbyl groups such as methyl ($CH_3$), ethyl ($CH_3CH_2$), n-propyl ($CH_3CH_2CH_2$), isopropyl (($CH_3)_2CH$), n-butyl ($CH_3CH_2CH2CH_2$), isobutyl (($CH_3)_2CHCH_2$), sec-butyl (($CH_3)(CH_3CH_2)CH$), t-butyl (($CH_3)_3C$), n-pentyl ($CH_3CH_2CH_2CH_2CH_2$), and neopentyl (($CH_3)_3CCH_2$).

"Alkenyl" refers to a linear or branched hydrocarbyl group having from 2 to 10 carbon atoms and in some embodiments from 2 to 6 carbon atoms or 2 to 4 carbon atoms and having at least 1 site of vinyl unsaturation (>C=C<). For example, ($C_x$-$C_y$)alkenyl refers to alkenyl groups having from x to y carbon atoms and is meant to include for example, ethenyl, propenyl, 1,3-butadienyl, and so forth.

"Alkynyl" refers to refers to a linear or branched monovalent hydrocarbon radical containing at least one triple bond. The term "alkynyl" may also include those hydrocarbyl groups having other types of bonds, such as a double bond and a triple bond.

"Aryl" refers to an aromatic group of from 3 to 14 carbon atoms and no ring heteroatoms and having a single ring (e.g., phenyl) or multiple condensed (fused) rings (e.g., naphthyl or anthryl). For multiple ring systems, including fused, bridged, and spiro ring systems having aromatic and non-aromatic rings that have no ring heteroatoms, the term "Aryl" applies when the point of attachment is at an aromatic carbon atom (e.g., 5,6,7,8 tetrahydronaphthalene-2-yl is an aryl group as its point of attachment is at the 2-position of the aromatic phenyl ring).

"Cycloalkyl" refers to a saturated or partially saturated cyclic group of from 3 to 14 carbon atoms and no ring heteroatoms and having a single ring or multiple rings including fused, bridged, and spiro ring systems. For multiple ring systems having aromatic and non-aromatic rings that have no ring heteroatoms, the term "cycloalkyl" applies when the point of attachment is at a non-aromatic carbon atom (e.g., 5,6,7,8-tetrahydronaphthalene-5-yl). The term "cycloalkyl" includes cycloalkenyl groups, such as adamantyl, cyclopropyl, cyclobutyl, cyclopentyl, cyclooctyl, and cyclohexenyl. The term "cycloalkenyl" is sometimes employed to refer to a partially saturated cycloalkyl ring having at least one site of >C=C< ring unsaturation.

"Halo" or "halogen" refers to fluoro, chloro, bromo, and iodo.

"Haloalkyl" refers to substitution of alkyl groups with 1 to 5 or in some embodiments 1 to 3 halo groups.

"Heteroaryl" refers to an aromatic group of from 1 to 14 carbon atoms and 1 to 6 heteroatoms selected from oxygen, nitrogen, and sulfur and includes single ring (e.g., imidazolyl) and multiple ring systems (e.g., benzimidazol-2-yl and benzimidazol-6-yl). For multiple ring systems, including fused, bridged, and spiro ring systems having aromatic and non-aromatic rings, the term "heteroaryl" applies if there is at least one ring heteroatom and the point of attachment is at an atom of an aromatic ring (e.g., 1,2,3,4-tetrahydroquinolin-6-yl and 5,6,7,8-tetrahydroquinolin-3-yl). In some embodiments, the nitrogen and/or the sulfur ring atom(s) of the heteroaryl group are optionally oxidized to provide for the N oxide (N→O), sulfinyl, or sulfonyl moieties. Examples of heteroaryl groups include, but are not limited to, pyridyl, furanyl, thienyl, thiazolyl, isothiazolyl, triazolyl, imidazolyl, imidazolinyl, isoxazolyl, pyrrolyl, pyrazolyl, pyridazinyl, pyrimidinyl, purinyl, phthalazyl, naphthylpryidyl, benzofuranyl, tetrahydrobenzofuranyl, isobenzofuranyl, benzothiazolyl, benzoisothiazolyl, benzotriazolyl, indolyl, isoindolyl, indolizinyl, dihydroindolyl, indazolyl, indolinyl, benzoxazolyl, quinolyl, isoquinolyl, quinolizyl, quianazolyl, quinoxalyl, tetrahydroquinolinyl, isoquinolyl, quinazolinonyl, benzimidazolyl, benzisoxazolyl, benzothienyl, benzopyridazinyl, pteridinyl, carbazolyl, carbolinyl, phenanthridinyl, acridinyl, phenanthrolinyl, phenazinyl, phenoxazinyl, phenothiazinyl, and phthalimidyl.

"Heterocyclic" or "heterocycle" or "heterocycloalkyl" or "heterocyclyl" refers to a saturated or partially saturated cyclic group having from 1 to 14 carbon atoms and from 1 to 6 heteroatoms selected from nitrogen, sulfur, or oxygen and includes single ring and multiple ring systems including fused, bridged, and spiro ring systems. For multiple ring systems having aromatic and/or non-aromatic rings, the terms "heterocyclic", "heterocycle", "heterocycloalkyl", or "heterocyclyl" apply when there is at least one ring heteroatom and the point of attachment is at an atom of a non-aromatic ring (e.g., decahydroquinolin-6-yl). In some embodiments, the nitrogen and/or sulfur atom(s) of the heterocyclic group are optionally oxidized to provide for the N oxide, sulfinyl, sulfonyl moieties. Examples of heterocyclyl groups include, but are not limited to, azetidinyl, tetrahydropyranyl, piperidinyl, N-methylpiperidin-3-yl, piperazinyl, N-methylpyrrolidin-3-yl, 3-pyrrolidinyl, 2-pyrrolidon-1-yl, morpholinyl, thiomorpholinyl, imidazolidinyl, and pyrrolidinyl.

It should be understood that the aforementioned definitions encompass unsubstituted groups, as well as groups substituted with one or more other functional groups as is known in the art. For example, an aryl, heteroaryl, cycloalkyl, or heterocyclyl group may be substituted with from 1 to 8, in some embodiments from 1 to 5, in some embodiments from 1 to 3, and in some embodiments, from 1 to 2 substituents selected from alkyl, alkenyl, alkynyl, alkoxy, acyl, acylamino, acyloxy, amino, quaternary amino, amide, imino, amidino, aminocarbonylamino, amidinocarbonylamino, aminothiocarbonyl, aminocarbonylamino, aminothiocarbonylamino, aminocarbonyloxy, aminosulfonyl, aminosulfonyloxy, aminosulfonylamino, aryl, aryloxy, arylthio, azido, carboxyl, carboxyl ester, (carboxyl ester)amino, (carboxyl ester)oxy, cyano, cycloalkyl, cycloalkyloxy, cycloalkylthio, guanidino, halo, haloalkyl, haloalkoxy, hydroxy, hydroxyamino, alkoxyamino, hydrazino, heteroaryl, heteroaryloxy, heteroarylthio, heterocyclyl, heterocyclyloxy, heterocyclylthio, nitro, oxo, thione, phosphate, phosphonate, phosphinate, phosphonamidate, phosphorodiamidate, phosphoramidate monoester, cyclic phosphoramidate, cyclic phosphorodiamidate, phosphoramidate diester, sulfate, sulfonate, sulfonyl, substituted sulfonyl, sulfonyloxy, thioacyl, thiocyanate, thiol, alkylthio, etc., as well as combinations of such substituents.

It is to be understood by one of ordinary skill in the art that the present discussion is a description of exemplary embodiments only, and is not intended as limiting the broader aspects of the present invention.

Generally speaking, the present invention is directed to a method for injection molding a thermoplastic composition that contains a polyarylene sulfide and an aromatic amide oligomer. The present inventors have discovered that the aromatic amide oligomer can significantly improve the crystallization properties of the composition, which allows it to be molded at lower temperatures while still achieving the same degree of crystallization. For example, the mold temperature (e.g., temperature of a surface of the mold) may be from about 50° C. to about 120° C., in some embodiments from about 60° C. to about 110° C., and in some embodiments, from about 70° C. to about 90° C. Shorter cooling cycles may also be employed. In addition to minimizing the energy requirements for the molding operation, such low mold temperatures and/or short cooling cycles may be accomplished using cooling mediums that are less corrosive and expensive than some conventional techniques. For example, liquid water may be employed as the cooling medium. Further, the use of low mold temperatures can also decrease the production of "flash" normally associated with high temperature molding operations. For example, the length of any flash (also known as burrs) created during a molding operation may be about 0.17 millimeters or less, in some embodiments about 0.14 millimeters or less, and in some embodiments, about 0.13 millimeters or less.

Various embodiments of the present invention will now be described in greater detail below.

I. Thermoplastic Composition

A. Polyarylene Sulfide

As noted above, the thermoplastic composition contains at least one polyarylene sulfide, which is generally able to withstand relatively high temperatures without melting. Although the actual amount may vary depending on desired application, polyarylene sulfide(s) typically constitute from about 30 wt. % to about 95 wt. %, in some embodiments from about 35 wt. % to about 90 wt. %, and in some embodiments, from about 40 wt. % to about 80 wt. % of the thermoplastic composition. The polyarylene sulfide(s) generally have repeating units of the formula:

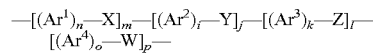

wherein, $Ar^1$, $Ar^2$, $Ar^3$, and $Ar^4$ are independently arylene units of 6 to 18 carbon atoms;

W, X, Y, and Z are independently bivalent linking groups selected from —SO$_2$—, —S—, —SO—, —CO—, —O—, —C(O)O— or alkylene or alkylidene groups of 1 to 6 carbon atoms, wherein at least one of the linking groups is —S—; and n, m, i, j, k, l, o, and p are independently 0, 1, 2, 3, or 4, subject to the proviso that their sum total is not less than 2.

The arylene units $Ar^1$, $Ar^2$, $Ar^3$, and $Ar^4$ may be selectively substituted or unsubstituted. Advantageous arylene units are phenylene, biphenylene, naphthylene, anthracene and phenanthrene. The polyarylene sulfide typically include's more than about 30 mol %, more than about 50 mol %, or more than about 70 mol % arylene sulfide (—S—) units. For example, the polyarylene sulfide may include at least 85 mol % sulfide linkages attached directly to two aromatic rings. In one particular embodiment, the polyarylene sulfide is a polyphenylene sulfide, defined herein as containing the phenylene sulfide structure —(C$_6$H$_4$—S)$_n$— (wherein n is an integer of 1 or more) as a component thereof.

Synthesis techniques that may be used in making a polyarylene sulfide are generally known in the art. By way of example, a process for producing a polyarylene sulfide can include reacting a material that provides a hydrosulfide ion (e.g., an alkali metal sulfide) with a dihaloaromatic compound in an organic amide solvent. The alkali metal sulfide can be, for example, lithium sulfide, sodium sulfide, potassium sulfide, rubidium sulfide, cesium sulfide or a mixture thereof. When the alkali metal sulfide is a hydrate or an aqueous mixture, the alkali metal sulfide can be processed according to a dehydrating operation in advance of the polymerization reaction. An alkali metal sulfide can also be generated in situ. In addition, a small amount of an alkali metal hydroxide can be included in the reaction to remove or react impurities (e.g., to change such impurities to harmless materials) such as an alkali metal polysulfide or an alkali metal thiosulfate, which may be present in a very small amount with the alkali metal sulfide.

The dihaloaromatic compound can be, without limitation, an o-dihalobenzene, m-dihalobenzene, p-dihalobenzene, dihalotoluene, dihalonaphthalene, methoxy-dihalobenzene, dihalobiphenyl, dihalobenzoic acid, dihalodiphenyl ether, dihalodiphenyl sulfone, dihalodiphenyl sulfoxide or dihalodiphenyl ketone. Dihaloaromatic compounds may be used either singly or in any combination thereof. Specific exemplary dihaloaromatic compounds can include, without limitation, p-dichlorobenzene; m-dichlorobenzene; o-dichlorobenzene; 2,5-dichlorotoluene; 1,4-dibromobenzene; 1,4-dichloronaphthalene; 1-methoxy-2,5-dichlorobenzene; 4,4'-dichlorobiphenyl; 3,5-dichlorobenzoic acid; 4,4'-dichlorodiphenyl ether; 4,4'-dichlorodiphenylsulfone; 4,4'-dichlorodiphenylsulfoxide; and 4,4'-dichlorodiphenyl ketone. The halogen atom can be fluorine, chlorine, bromine or iodine, and two halogen atoms in the same dihalo-aromatic compound may be the same or different from each other. In one embodiment, o-dichlorobenzene, m-dichlorobenzene, p-dichlorobenzene or a mixture of two or more compounds thereof is used as the dihalo-aromatic compound. As is known in the art, it is also possible to use a monohalo compound (not necessarily an aromatic compound) in combination with the dihaloaromatic compound in order to form end groups of the polyarylene sulfide or to regulate the polymerization reaction and/or the molecular weight of the polyarylene sulfide.

The polyarylene sulfide(s) may be homopolymers or copolymers. For instance, selective combination of dihaloaromatic compounds can result in a polyarylene sulfide copolymer containing not less than two different units. For instance, when p-dichlorobenzene is used in combination with m-dichlorobenzene or 4,4'-dichlorodiphenylsulfone, a polyarylene sulfide copolymer can be formed containing segments having the structure of formula:

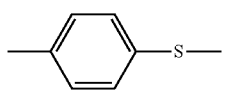

and segments having the structure of formula:

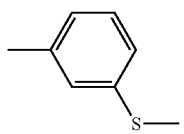

or segments having the structure of formula:

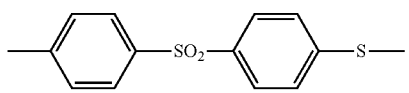

In another embodiment, a polyarylene sulfide copolymer may be formed that includes a first segment with a number-average molar mass Mn of from 1000 to 20,000 g/mol. The first segment may include first units that have been derived from structures of the formula:

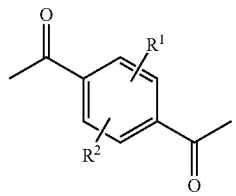

where the radicals $R^1$ and $R^2$, independently of one another, are a hydrogen, fluorine, chlorine or bromine atom or a branched or unbranched alkyl or alkoxy radical having from 1 to 6 carbon atoms; and/or second units that are derived from structures of the formula:

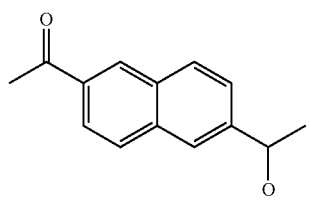 [SMILES: CC(=O)c1ccc2cc(C(C)O)ccc2c1]

The first unit may be p-hydroxybenzoic acid or one of its derivatives, and the second unit may be composed of 2-hydroxynaphthalene-6-carboxylic acid. The second segment may be derived from a polyarylene sulfide structure of the formula:

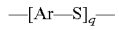

where Ar is an aromatic radical, or more than one condensed aromatic radical, and q is a number from 2 to 100, in particular from 5 to 20. The radical Ar may be a phenylene or naphthylene radical. In one embodiment, the second segment may be derived from poly(m-thiophenylene), from poly(o-thiophenylene), or from poly(p-thiophenylene).

The polyarylene sulfide(s) may be linear, semi-linear, branched or crosslinked. Linear polyarylene sulfides typically contain 80 mol % or more of the repeating unit —(Ar—S)—. Such linear polymers may also include a small amount of a branching unit or a cross-linking unit, but the amount of branching or cross-linking units is typically less than about 1 mol % of the total monomer units of the polyarylene sulfide. A linear polyarylene sulfide polymer may be a random copolymer or a block copolymer containing the above-mentioned repeating unit. Semi-linear polyarylene sulfides may likewise have a cross-linking structure or a branched structure introduced into the polymer a small amount of one or more monomers having three or more reactive functional groups. By way of example, monomer components used in forming a semi-linear polyarylene sulfide can include an amount of polyhaloaromatic compounds having two or more halogen substituents per molecule which can be utilized in preparing branched polymers. Such monomers can be represented by the formula $R'X_n$, where each X is selected from chlorine, bromine, and iodine, n is an integer of 3 to 6, and R' is a polyvalent aromatic radical of valence n which can have up to about 4 methyl substituents, the total number of carbon atoms in R' being within the range of 6 to about 16. Examples of some polyhaloaromatic compounds having more than two halogens substituted per molecule that can be employed in forming a semi-linear polyarylene sulfide include 1,2,3-trichlorobenzene, 1,2,4-trichlorobenzene, 1,3-dichloro-5-bromobenzene, 1,2,4-triiodobenzene, 1,2,3,5-tetrabromobenzene, hexachlorobenzene, 1,3,5-trichloro-2,4,6-trimethylbenzene, 2,2',4,4'-tetrachlorobiphenyl, 2,2',5,5'- tetra-iodobiphenyl, 2,2',6,6'-tetrabromo-3,3',5,5'-tetramethylbiphenyl, 1,2,3,4-tetrachloronaphthalene, 1,2,4-tribromo-6-methylnaphthalene, etc., and mixtures thereof.

Regardless of the particular structure, the number average molecular weight of the polyarylene sulfide is typically about 15,000 g/mol or more, and in some embodiments, about 30,000 g/mol or more. In certain cases, a small amount of chlorine may be employed during formation of the polyarylene sulfide. Nevertheless, the polyarylene sulfide will still have a low chlorine content, such as about 1000 ppm or less, in some embodiments about 900 ppm or less, in some embodiments from about 1 to about 800 ppm, and in some embodiments, from about 2 to about 700 ppm. In certain embodiments, however, the polyarylene sulfide is generally free of chlorine or other halogens.

B. Aromatic Amide Oligomer

Aromatic amide oligomers typically constitute from about 0.1 wt. % to about 8 wt. %, in some embodiments from about 0.2 wt. % to about 4 wt. %, and in some embodiments, from about 0.5 wt. % to about 2.5 wt. % of the thermoplastic composition. The aromatic amide oligomer generally has a relatively low molecular weight so that it can aid in reducing high shear viscosity and also improve the crystallization properties of the polyarylene sulfide. For example, the oligomer typically has a molecular weight of about 3,000 grams per mole or less, in some embodiments from about 50 to about 2,000 grams per mole, in some embodiments from about 100 to about 1,500 grams per mole, and in some embodiments, from about 200 to about 1,200 grams per mole.

In addition to possessing a relatively low molecular weight, the oligomer also generally possesses a high amide functionality. Without intending to be limited by theory, it is believed that active hydrogen atoms of the amide functional groups are capable of forming a hydrogen bond with the backbone of polyarylene sulfides. Such hydrogen bonding strengthens the attachment of the oligomer to the polyarylene sulfide matrix and thus minimizes the likelihood that it becomes volatilized during compounding, molding, and/or use. This minimizes off-gassing and the formation of blisters that would otherwise impact the final mechanical properties of a part made from the polymer composition. The degree of amide functionality for a given molecule may be characterized by its "amide equivalent weight", which reflects the amount of a compound that contains one molecule of an amide functional group and may be calculated by dividing the molecular weight of the compound by the number of amide groups in the molecule. For example, the aromatic amide oligomer may contain from 1 to 15, in some embodiments from 2 to 10, and in some embodiments, from 2 to 8 amide functional groups per molecule. The amide equivalent weight may likewise be from about 10 to about 1,000 grams per mole or less, in some embodiments from about 50 to about 500 grams per mole, and in some embodiments, from about 100 to about 300 grams per mole.

While providing the benefits noted, the aromatic amide oligomer does not generally react with the polymer backbone of the polyarylene sulfide to any appreciable extent so that the mechanical properties of the polymer are not adversely impacted. To help better minimize reactivity, the oligomer typically contains a core formed from one or more aromatic rings (including heteroaromatic). The oligomer may also contain terminal groups formed from one or more aromatic rings. Such an "aromatic" oligomer thus possesses little, if any, reactivity with the base polymer. For example, one embodiment of such an aromatic amide oligomer is provided below in Formula (I):

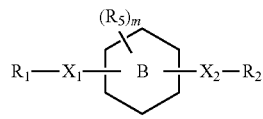

wherein, ring B is a 6-membered aromatic ring wherein 1 to 3 ring carbon atoms are optionally replaced by nitrogen or oxygen, wherein each nitrogen is optionally oxidized, and wherein ring B may be optionally fused or linked to a 5- or 6-membered aryl, heteroaryl, cycloalkyl, or heterocyclyl;

$R_5$ is halo, haloalkyl, alkyl, alkenyl, aryl, heteroaryl, cycloalkyl, or heterocyclyl;

m is from 0 to 4;

$X_1$ and $X_2$ are independently C(O)HN or NHC(O); and $R_1$ and $R_2$ are independently selected from aryl, heteroaryl, cycloalkyl, and heterocyclyl.

In certain embodiments, Ring B may be selected from the following:

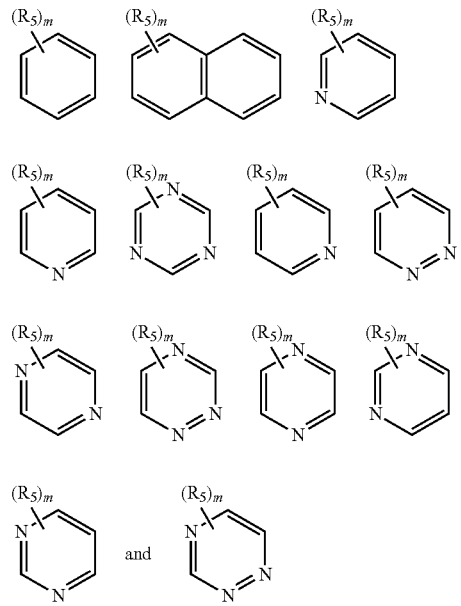

wherein, m is 0, 1, 2, 3, or 4, in some embodiments m is 0, 1, or 2, in some embodiments m is 0 or 1, and in some embodiments, m is 0; and $R_5$ is halo, haloalkyl, alkyl, alkenyl, aryl, heteroaryl, cycloalkyl, or heterocyclyl. Ring B may be phenyl.

In certain embodiments, the oligomer is a di-functional compound in that Ring B is directly bonded to only two (2) amide groups (e.g., C(O)HN or NHC(O)). In such embodiments, m in Formula (I) may be 0. Of course, in certain embodiments, Ring B may also be directly bonded to three (3) or more amide groups. For example, one embodiment of such a compound is provided by general formula (II):

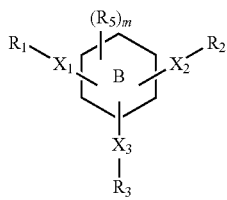

(II)

wherein,
ring B, $R_5$, $X_1$, $X_2$, $R_1$, and $R_2$ are as defined above;
m is from 0 to 3;
$X_3$ is C(O)HN or NHC(O); and
$R_3$ is selected from aryl, heteroaryl, cycloalkyl, and heterocyclyl.

Another embodiment of such a compound is provided by general formula (III):

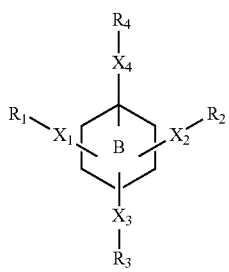

(III)

wherein,
ring B, $R_5$, $X_1$, $X_2$, $X_3$, $R_1$, $R_2$, and $R_3$ are as defined above;
$X_4$ is C(O)HN or NHC(O); and
$R_4$ is selected from aryl, heteroaryl, cycloalkyl, and heterocyclyl.

In some embodiments, $R_1$, $R_2$, $R_3$, and/or $R_4$ in the structures noted above may be selected from the following:

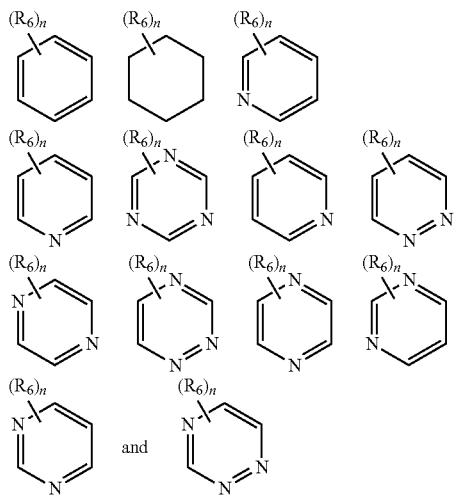

wherein,
n is 0, 1, 2, 3, 4, or 5, in some embodiments n is 0, 1, or 2, and in some embodiments, n is 0 or 1; and
$R_6$ is halo, haloalkyl, alkyl, alkenyl, alkynyl, aryl, heteroaryl, cycloalkyl, or heterocyclyl.

In one particular embodiment, the aromatic amide oligomer has the following general formula (IV):

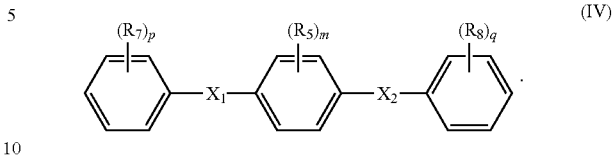

(IV)

wherein,
$X_1$ and $X_2$ are independently C(O)HN or NHC(O);
$R_5$, $R_7$, and $R_8$ are independently selected from halo, haloalkyl, alkyl, alkenyl, alkynyl, aryl, heteroaryl, cycloalkyl, and heterocyclyl;
m is from 0 to 4; and
p and q are independently from 0 to 5.

In another embodiment, the aromatic amide oligomer has the following general formula (V):

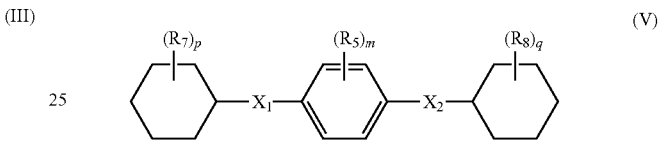

(V)

wherein,
$X_1$, $X_2$, $R_5$, $R_7$, $R_8$, m, p, and q are as defined above.

For example, in certain embodiments, m, p, and q in Formula (IV) and Formula (V) may be equal to 0 so that the core and terminal aromatic groups are unsubstituted. In other embodiments, m may be 0 and p and q may be from 1 to 5. In such embodiments, for example, $R_7$ and/or $R_8$ may be halo (e.g., fluorine). In other embodiments, $R_7$ and/or $R_8$ may be aryl (e.g., phenyl) or aryl substituted with an amide group having the structure: —C(O)$R_{12}$N— or —N$R_{13}$C(O)—, wherein $R_{12}$ and $R_{13}$ are independently selected from hydrogen, alkyl, alkenyl, alkynyl, aryl, heteroaryl, cycloalkyl, and heterocyclyl. In one particular embodiment, for example, $R_6$ and/or $R_7$ are phenyl substituted with —C(O)HN— or —NHC(O)—. In yet other embodiments, $R_7$ and/or $R_8$ may be heteroaryl (e.g., pyridinyl).

In yet another embodiment, the aromatic amide oligomer has the following general formula (VI):

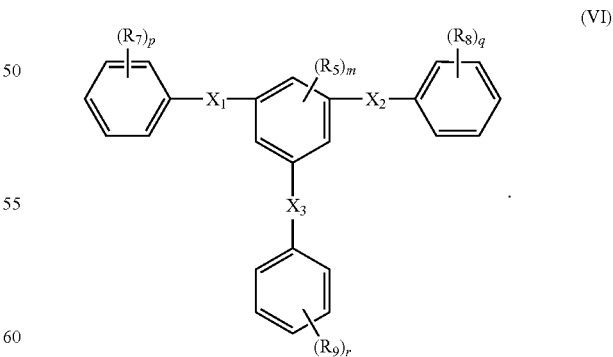

(VI)

wherein,
$X_1$, $X_2$, and $X_3$ are independently C(O)HN or NHC(O);
$R_5$, $R_7$, $R_8$, and $R_9$ are independently selected from halo, haloalkyl, alkyl, alkenyl, alkynyl, aryl, heteroaryl, cycloalkyl, and heterocyclyl;

m is from 0 to 3; and p, q, and r are independently from 0 to 5.

In yet another embodiment, the aromatic amide oligomer has the following general formula (VII):

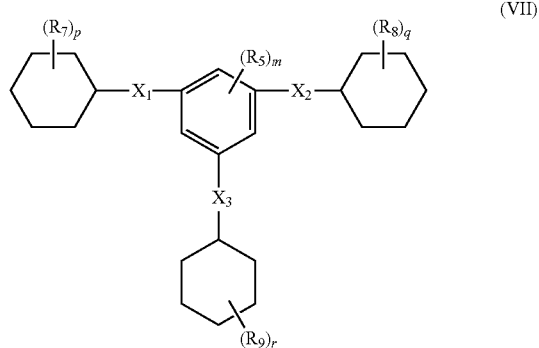

(VII)

wherein, $X_1$, $X_2$, $X_3$, $R_5$, $R_7$, $R_8$, $R_9$, m, p, q, and r are as defined above.

For example, in certain embodiments, m, p, q, and r in Formula (VI) or in Formula (VII) may be equal to 0 so that the core and terminal aromatic groups are unsubstituted. In other embodiments, m may be 0 and p, q, and r may be from 1 to 5. In such embodiments, for example, $R_7$, $R_8$, and/or $R_9$ may be halo (e.g., fluorine). In other embodiments, $R_7$, $R_8$, and/or $R_9$ may be aryl (e.g., phenyl) or aryl substituted with an amide group having the structure: —C(O)$R_{12}$N— or —N$R_{13}$C(O)—, wherein $R_{12}$ and $R_{13}$ are independently selected from hydrogen, alkyl, alkenyl, alkynyl, aryl, heteroaryl, cycloalkyl, and heterocyclyl. In one particular embodiment, for example, $R_7$, $R_8$, and/or $R_9$ are phenyl substituted with —C(O)HN— or —NHC(O)—. In yet other embodiments, $R_7$, $R_8$, and/or $R_9$ may be heteroaryl (e.g., pyridinyl).

Specific embodiments of the aromatic amide oligomer of the present invention are also set forth in the table below:

| Cmpd # | Structure | Name |
|---|---|---|
| A | | N1,N4-diphenyl-terephthalamide |
| B | | N1,N4-diphenyl-isoterephthalamide |
| C | | N1,N4-bis(2,3,4,5,6-pentafluorophenyl)terephthalamide |
| D | | N1,N4-bis(4-benzamidophenyl)terephthalamide |

-continued

| Cmpd # | Structure | Name |
|---|---|---|
| E | | N4-phenyl-N1-[4-[[4-(phenylcarbamoyl)benzoyl]amino]phenyl]terephthalamide |
| F1 | | N4-phenyl-N1-[3-[[4-(phenylcarbamoyl)benzoyl]amino]phenyl]terephthalamide |
| F2 | | N1,N3-bis(4-benzamidophenyl)benzene-1,3-dicarboxamide |
| G1 | | N3-phenyl-N1-[3-[[3-(phenylcarbamoyl)benzoyl]amino]phenyl]benzene-1,3-dicarboxamide |

-continued

| Cmpd # | Structure | Name |
|---|---|---|
| G2 | | N1,N3-bis(3-benzamidophenyl)benzene-1,3-dicarboxamide |
| H | | N1,N4-bis(4-pyridyl)terephthalamide |
| I | | N1,N3-bis(4-phenylphenyl)benzene-1,3-dicarboxamide |
| J | | N1,N3,N5-triphenylbenzene-1,3,5-tricarboxamide |

-continued

| Cmpd # | Structure | Name |
|---|---|---|
| K | | N1,N3,N5-tris(4-benzamidophenyl)benzene-1,3,5-tricarboxamide |
| L | | N-(4,6-dibenzamido-1,3,5-triazin-2-yl)benzamide |
| M1 | | N2,N7-dicyclohexyl-naphthalene-2,7-dicarboxamide |
| M2 | | N2,N6-dicyclohexyl-naphthalene-2,6-dicarboxamide |

| Cmpd # | Structure | Name |
|---|---|---|
| N | | N1,N3,N5-tris(3-benzamidophenyl)benzene-1,3,5-tricarboxamide |
| O1 | | N,N'-dicyclohexyl-isoterephthalamide |
| O2 | | N,N'-dicyclohexyl-terephthalamide |

C. Other Additives

In addition to aromatic amide oligomers and polyarylene sulfides, the thermoplastic composition may also contain a variety of other different components to help improve its overall properties. In certain embodiments, for example, a nucleating agent may be employed in conjunction with the aromatic amide oligomer to further enhance the crystallization properties of the composition. One example of such a nucleating agent is an inorganic crystalline compound, such as boron-containing compounds (e.g., boron nitride, sodium tetraborate, potassium tetraborate, calcium tetraborate, etc.), alkaline earth metal carbonates (e.g., calcium magnesium carbonate), oxides (e.g., titanium oxide, aluminum oxide, magnesium oxide, zinc oxide, antimony trioxide, etc.), silicates (e.g., talc, sodium-aluminum silicate, calcium silicate, magnesium silicate, etc.), salts of alkaline earth metals (e.g., calcium carbonate, calcium sulfate, etc.), and so forth. Boron nitride (BN) has been found to be particularly beneficial when employed in the thermoplastic composition of the present invention. Boron nitride exists in a variety of different crystalline forms (e.g., h-BN—hexagonal, c-BN—cubic or spharlerite, and w-BN—wurtzite), any of which can generally be employed in the present invention. The hexagonal crystalline form is particularly suitable due to its stability and softness.

When employed, the weight ratio of aromatic amide oligomers to inorganic crystalline compounds is typically from about 0.8 to about 20, in some embodiments from about 1 to about 10, and in some embodiments, from about 1.5 to about 5. For example, aromatic amide oligomers may constitute from about 40 wt. % to about 95 wt. %, in some embodiments from about 50 wt. % to about 90 wt %, and in some embodiments, from about 60 wt. % to about 80 wt % of the combined weight of the oligomers and inorganic crystalline compounds. Likewise, inorganic crystalline compounds may constitute from about 5 wt. % to about 60 wt. %, in some embodiments from about 10 wt. % to about 50 wt. %, and in some embodiments, from about 20 wt. % to about 40 wt. % of the combined weight of the oligomers and inorganic crystalline compounds, as well as from about 0.01 wt. % to about 6 wt. %, in some embodiments from about 0.05 wt. % to about 3 wt. %, and in some embodiments, from about 0.1 wt. % to about 2 wt. % of the thermoplastic composition.

Another suitable additive that may be employed to improve the mechanical properties of the composition is an impact modifier. Examples of suitable impact modifiers may include, for instance, polyepoxides, polyurethanes, polybutadiene, acrylonitrile-butadiene-styrene, polysiloxanes etc., as well as mixtures thereof. In one particular embodiment, a polyepoxide modifier is employed that contains at least two oxirane rings per molecule. The polyepoxide may be a linear or branched, homopolymer or copolymer (e.g., random, graft, block, etc.) containing terminal epoxy groups, skeletal oxirane units, and/or pendent epoxy groups. The monomers employed to form such polyepoxides may vary. In one particular embodiment, for example, the polyepoxide modifier contains at least one epoxy-functional (meth)acrylic monomeric component. The term "(meth)acrylic" includes acrylic and methacrylic monomers, as well as salts or esters thereof, such as acrylate and methacrylate monomers. Suitable epoxy-functional (meth)acrylic monomers may include, but are not limited to, those containing 1,2-epoxy groups, such as glycidyl acrylate and glycidyl methacrylate. Other suitable epoxy-functional monomers include allyl glycidyl ether, glycidyl ethacrylate, and glycidyl itoconate.

If desired, additional monomers may also be employed in the polyepoxide to help achieve the desired melt viscosity. Such monomers may vary and include, for example, ester monomers, (meth)acrylic monomers, olefin monomers, amide monomers, etc. In one particular embodiment, for example, the polyepoxide modifier includes at least one linear or branched α-olefin monomer, such as those having from 2 to 20 carbon atoms and preferably from 2 to 8 carbon atoms. Specific examples include ethylene, propylene, 1-butene; 3-methyl-1-butene; 3,3-dimethyl-1-butene; 1-pentene; 1-pentene with one or more methyl, ethyl or propyl substituents; 1-hexene with one or more methyl, ethyl or propyl substituents; 1-heptene with one or more methyl, ethyl or propyl substituents; 1-octene with one or more methyl, ethyl or propyl substituents; 1-nonene with one or more methyl, ethyl or propyl substituents; ethyl, methyl or dimethyl-substituted 1-decene; 1-dodecene; and styrene. Particularly desired α-olefin comonomers are ethylene and propylene. In one particularly desirable embodiment of the present invention, the polyepoxide modifier is a copolymer formed from an epoxy-functional (meth)acrylic monomeric component and α-olefin monomeric component. For example, the polyepoxide modifier may be poly(ethylene-co-glycidyl methacrylate). One specific example of a suitable polyepoxide modifier that may be used in the present invention is commercially available from Arkema under the name Lotader® AX8840. Lotader® AX8950 has a melt flow rate of 5 g/10 min and has a glycidyl methacrylate monomer content of 8 wt. %.

Still another suitable additive that may be employed to improve the mechanical properties of the thermoplastic composition is an organosilane coupling agent. The coupling agent may, for example, be any alkoxysilane coupling agent as is known in the art, such as vinlyalkoxysilanes, epoxyalkoxysilanes, aminoalkoxysilanes, mercaptoalkoxysilanes, and combinations thereof. Aminoalkoxysilane compounds typically have the formula: $R^5$—Si—$(R^6)_3$, wherein $R^5$ is selected from the group consisting of an amino group such as $NH_2$; an aminoalkyl of from about 1 to about 10 carbon atoms, or from about 2 to about 5 carbon atoms, such as aminomethyl, aminoethyl, aminopropyl, aminobutyl, and so forth; an alkene of from about 2 to about 10 carbon atoms, or from about 2 to about 5 carbon atoms, such as ethylene, propylene, butylene, and so forth; and an alkyne of from about 2 to about 10 carbon atoms, or from about 2 to about 5 carbon atoms, such as ethyne, propyne, butyne and so forth; and wherein $R^6$ is an alkoxy group of from about 1 to about 10 atoms, or from about 2 to about 5 carbon atoms, such as methoxy, ethoxy, propoxy, and so forth. In one embodiment, $R^5$ is selected from the group consisting of aminomethyl, aminoethyl, aminopropyl, ethylene, ethyne, propylene and propyne, and $R^6$ is selected from the group consisting of methoxy groups, ethoxy groups, and propoxy groups. In another embodiment, $R^5$ is selected from the group consisting of an alkene of from about 2 to about 10 carbon atoms such as ethylene, propylene, butylene, and so forth, and an alkyne of from about 2 to about 10 carbon atoms such as ethyne, propyne, butyne and so forth, and $R^6$ is an alkoxy group of from about 1 to about 10 atoms, such as methoxy group, ethoxy group, propoxy group, and so forth. A combination of various aminosilanes may also be included in the mixture.

Some representative examples of aminosilane coupling agents that may be included in the mixture include aminopropyl triethoxysilane, aminoethyl triethoxysilane, aminopropyl trimethoxysilane, aminoethyl trimethoxysilane, ethylene trimethoxysilane, ethylene triethoxysilane, ethyne trimethoxysilane, ethyne triethoxysilane, aminoethylaminopropyltrimethoxysilane, 3-aminopropyl triethoxysilane, 3-aminopropyl trimethoxysilane, 3-aminopropyl methyl dimethoxysilane or 3-aminopropyl methyl diethoxysilane, N-(2-aminoethyl)-3-aminopropyl trimethoxysilane, N-methyl-3-aminopropyl trimethoxysilane, N-phenyl-3-aminopropyl trimethoxysilane, bis(3-aminopropyl)tetramethoxysilane, bis(3-aminopropyl)tetraethoxy disiloxane, and combinations thereof. The amino silane may also be an aminoalkoxysilane, such as γ-aminopropyltrimethoxysilane, aminopropyltriethoxysilane, γ-aminopropylmethyldimethoxysilane, γ-aminopropylmethyldiethoxysilane, N-(β-aminoethyl)-γ-aminopropyltrimethoxysilane, N-phenyl-γ-aminopropyltrimethoxysilane, γ-diallylaminopropyltrimethoxysilane and γ-diallylaminopropyltrimethoxysilane. One suitable amino silane is 3-aminopropyltriethoxysilane which is available from Degussa, Sigma Chemical Company, and Aldrich Chemical Company.

Fillers may also be employed in the thermoplastic composition to help achieve the desired properties and/or color. When employed, such mineral fillers typically constitute from about 5 wt. % to about 60 wt. %, in some embodiments from about 10 wt. % to about 50 wt. %, and in some embodiments, from about 15 wt. % to about 45 wt. % of the thermoplastic composition. Clay minerals may be particularly suitable for use in the present invention. Examples of such clay minerals include, for instance, talc ($Mg_3Si_4O_{10}(OH)_2$), halloysite ($Al_2Si_2O_5(OH)_4$), kaolinite ($Al_2Si_2O_5(OH)_4$), illite (($K,H_3O)(Al,Mg,Fe)_2(Si,Al)_4O_{10}[(OH)_2,(H_2O)]$), montmorillonite ($(Na,Ca)_{0.33}(Al,Mg)_2Si_4O_{10}(OH)_2 \cdot nH_2O$), vermiculite (($MgFe,Al)_3(Al,Si)_4O_{10}(OH)_2 \cdot 4H_2O$), palygorskite (($Mg,Al)_2Si_4O_{10}(OH) \cdot 4(H_2O)$), pyrophyllite ($Al_2Si_4O_{10}(OH)_2$), etc., as well as combinations thereof. In lieu of, or in addition to, clay minerals, still other mineral fillers may also be employed. For example, other suitable silicate fillers may also be employed, such as calcium silicate, aluminum silicate, mica, diatomaceous earth, wollastonite, and so forth. Mica, for instance, may be a particularly suitable mineral for use in the present invention. There are several chemically distinct mica species with considerable variance in geologic occurrence, but all have essentially the same crystal structure. As used herein, the term "mica" is meant to generically include any of these species, such as muscovite ($KAl_2(AlSi_3)O_{10}(OH)_2$), biotite ($K(Mg,Fe)_3(AlSi_3)O_{10}(OH)_2$), phlogopite ($KMg_3(AlSi_3)O_{10}(OH)_2$), lepidolite ($K(Li,Al)_{2-3}(AlSi_3)O_{10}(OH)_2$), glauconite ($(K,Na)(Al,Mg,Fe)_2(Si,Al)_4O_{10}(OH)_2$), etc., as well as combinations thereof.

Fibrous fillers may also be employed in the thermoplastic composition. When employed, such fibrous fillers typically constitute from about 5 wt. % to about 60 wt. %, in some embodiments from about 10 wt. % to about 50 wt. %, and in some embodiments, from about 15 wt. % to about 45 wt. % of the thermoplastic composition. The fibrous fillers may include one or more fiber types including, without limitation, polymer fibers, glass fibers, carbon fibers, metal fibers, and so forth, or a combination of fiber types. In one embodiment, the fibers may be chopped glass fibers or glass fiber ravings (tows). Fiber diameters can vary depending upon the particular fiber used and are available in either chopped or continuous form. The fibers, for instance, can have a diameter of less than about 100 μm, such as less than about 50 μm. For instance, the fibers can be chopped or continuous fibers and can have a fiber diameter of from about 5 μm to about 50 μm, such as from about 5 μm to about 15 μm.

Lubricants may also be employed in the thermoplastic composition that are capable of withstanding the processing conditions of poly(arylene sulfide) (typically from about 290° C. to about 320° C.) without substantial decomposition. Exemplary of such lubricants include fatty acids esters, the salts thereof, esters, fatty acid amides, organic phosphate esters, and hydrocarbon waxes of the type commonly used as lubricants in the processing of engineering plastic materials, including mixtures thereof. Suitable fatty acids typically have a backbone carbon chain of from about 12 to about 60 carbon atoms, such as myristic acid, palmitic acid, stearic acid, arachic acid, montanic acid, octadecinic acid, parinric acid, and so forth. Suitable esters include fatty acid esters, fatty alcohol esters, wax esters, glycerol esters, glycol esters and complex esters. Fatty acid amides include fatty primary amides, fatty secondary amides, methylene and ethylene bisamides and alkanolamides such as, for example, palmitic acid amide, stearic acid amide, oleic acid amide, N,N'-ethylenebisstearamide and so forth. Also suitable are the metal salts of fatty acids such as calcium stearate, zinc stearate, magnesium stearate, and so forth; hydrocarbon waxes, including paraffin waxes, polyolefin and oxidized polyolefin waxes, and microcrystalline waxes. Particularly suitable lubricants are acids, salts, or amides of stearic acid, such as pentaerythritol tetrastearate, calcium stearate, or N,N'-ethylenebisstearamide. When employed, the lubricant(s) typically constitute from about 0.05 wt. % to about 1.5 wt. %, and in some embodiments, from about 0.1 wt. % to about 0.5 wt. % of the thermoplastic composition.

Still another additive that may be employed in the thermoplastic composition is a disulfide compound. Without wishing to be bound by any particular theory, the disulfide compound can undergo a polymer scission reaction with a polyarylene sulfide during melt processing that even further lowers the overall melt viscosity of the composition. When employed, disulfide compounds typically constitute from about 0.01 wt. % to about 3 wt. %, in some embodiments from about 0.02 wt. % to about 1 wt. %, and in some embodiments, from about 0.05 wt. % to about 0.5 wt. % of the composition. The ratio of the amount of the polyarylene sulfide to the amount of the disulfide compound may likewise be from about 1000:1 to about 10:1, from about 500:1 to about 20:1, or from about 400:1 to about 30:1. Suitable disulfide compounds are typically those having the following formula:

wherein $R^3$ and $R^4$ may be the same or different and are hydrocarbon groups that independently include from 1 to about 20 carbons. For instance, $R^3$ and $R^4$ may be an alkyl, cycloalkyl, aryl, or heterocyclic group. In certain embodiments, $R^3$ and $R^4$ are generally nonreactive functionalities, such as phenyl, naphthyl, ethyl, methyl, propyl, etc. Examples of such compounds include diphenyl disulfide, naphthyl disulfide, dimethyl disulfide, diethyl disulfide, and dipropyl disulfide. $R^3$ and $R^4$ may also include reactive functionality at terminal end(s) of the disulfide compound. For example, at least one of $R^3$ and $R^4$ may include a terminal carboxyl group, hydroxyl group, a substituted or non-substituted amino group, a nitro group, or the like. Examples of compounds may include, without limitation, 2,2'-diaminodiphenyl disulfide, 3,3'-diaminodiphenyl disulfide, 4,4'-diaminodiphenyl disulfide, dibenzyl disulfide, dithiosalicyclic acid, dithioglycolic acid, α,α'-dithiodilactic acid, β,β'-dithiodilactic acid, 3,3'-dithiodipyridine, 4,4'dithiomorpholine, 2,2'-dithiobis(benzothiazole), 2,2'-dithiobis(benzimidazole), 2,2'-dithiobis(benzoxazole) and 2-(4'-morpholinodithio)benzothiazole.

Still other additives that can be included in the composition may include, for instance, antimicrobials, pigments, antioxidants, stabilizers, surfactants, waxes, flow promoters, solid solvents, and other materials added to enhance properties and processability.

The manner in which the aromatic amide oligomer, polyarylene sulfide, and other optional additives are combined may vary as is known in the art. For instance, the materials may be supplied either simultaneously or in sequence to a melt processing device that dispersively blends the materials. Batch and/or continuous melt processing techniques may be employed. For example, a mixer/kneader, Banbury mixer, Farrel continuous mixer, single-screw extruder, twin-screw extruder, roll mill, etc., may be utilized to blend and melt process the materials. One particularly suitable melt processing device is a co-rotating, twin-screw extruder (e.g., Leistritz co-rotating fully intermeshing twin screw extruder). Such extruders may include feeding and venting ports and provide high intensity distributive and dispersive mixing. For example, the polyarylene sulfide and oligomer may be fed to the same or different feeding ports of a twin-screw extruder and melt blended to form a substantially homogeneous melted mixture. Melt blending may occur under high shear/pressure and heat to ensure sufficient dispersion. For example, melt processing may occur at a temperature of from about 50° C. to about 500° C., and in some embodiments, from about 100° C. to about 250° C. Likewise, the apparent shear rate during melt processing may range from about 100 seconds$^{-1}$ to about 10,000 seconds$^{-1}$, and in some embodiments, from about 500 seconds$^{-1}$ to about 1,500 seconds$^{-1}$. Of course, other variables, such as the residence time during melt processing, which is inversely proportional to throughput rate, may also be controlled to achieve the desired degree of homogeneity.

Besides melt blending, other techniques may also be employed to combine the aromatic amide oligomer and the polyarylene sulfide. For example, the oligomer may be supplied during one or more stages of the polymerization of the polyarylene sulfide, such as to the polymerization apparatus. Although it may be introduced at any time, it is typically desired to apply the oligomer before polymerization has been initiated, and typically in conjunction with the precursor monomers for the polyarylene sulfide. The reaction mixture is generally heated to an elevated temperature within the polymerization reactor vessel to initiate melt polymerization of the reactants.

Regardless of the manner in which they are combined together, the degree and rate of crystallization may be significantly enhanced by the nucleation system of the present invention. For example, the crystallization potential of the thermoplastic composition (prior to molding) may be about 55% or more, in some embodiments about 65% or more, in some embodiments about 70% or more, and in some embodiments, from about 75% to about 95%. The crystallization potential may be determined by subtracting the latent heat of crystallization ($\Delta H_c$) from the latent heat of fusion ($\Delta H_f$), dividing this difference by the latent heat of fusion, and then multiplying by 100. The latent heat of fusion ($\Delta H_f$) and latent heat of crystallization ($\Delta H_c$) may be determined by Differential Scanning calorimetry ("DSC") as is well known in the art and in accordance with ISO Standard 10350. The latent heat of crystallization may, for example, be about 15 Joules per gram ("J/g") or less, in some embodiments about 12 J/g or less, in some embodiments about 8 J/g or less, and in some embodiments, from about 1 to about 5 J/g. The latent heat of fusion may likewise be about 15 Joules per gram ("J/g") or more, in some embodiments about 20 J/g or more, in some embodiments about 22 J/g or more, and in some embodiments, from about 22 to about 28 J/g.

In addition, the thermoplastic composition may also crystallize at a lower temperature than would otherwise occur absent the presence of the aromatic amide oligomer. For example, the crystallization temperature (prior to molding) of the thermoplastic composition may about 250° C. or less, in some embodiments from about 100° C. to about 245° C., and in some embodiments, from about 150° C. to about 240° C. The melting temperature of the thermoplastic composition may also range from about 250° C. to about 320° C., and in some embodiments, from about 260° C. to about 300° C. The melting and crystallization temperatures may be determined as is well known in the art using differential scanning calorimetry in accordance with ISO Test No. 11357. Even at such melting temperatures, the ratio of the deflection temperature under load ("DTUL"), a measure of short term heat resistance, to the melting temperature may still remain relatively high. For example, the ratio may range from about 0.65 to about 1.00, in some embodiments from about 0.70 to about 0.99, and in some embodiments, from about 0.80 to about 0.98. The specific DTUL values may, for instance, range from about 230° C. to about 300° C., in some embodiments from about 240° C. to about 290° C., and in some embodiments, from about 250° C. to about 280° C. Such high DTUL values can, among other things, allow the use of high speed processes often employed during the manufacture of components having a small dimensional tolerance.

The present inventors have also discovered that the thermoplastic composition may possess a relatively low melt viscosity, which allows it to readily flow into the mold cavity during production of the part. For instance, the composition may have a melt viscosity of about 20 poise or less, in some embodiments about 15 poise or less, and in some embodiments, from about 0.1 to about 10 poise, as determined by a capillary rheometer at a temperature of 316° C. and shear rate of 1200 seconds$^{-1}$. Among other things, these viscosity properties can allow the composition to be readily injection molded into parts having very small dimensions without producing excessive amounts of flash.

The thermoplastic composition of the present invention has also been found to possess excellent mechanical properties. For example, the composition may possess a high impact strength, which is useful when forming small parts. The composition may, for instance, possess an Izod notched impact strength greater than about 4 kJ/m$^2$, in some embodiments from about 5 to about 40 kJ/m$^2$, and in some embodiments, from about 6 to about 30 kJ/m$^2$, measured at 23° C. according to ISO Test No. 180) (technically equivalent to ASTM D256, Method A). The tensile and flexural mechanical properties of the composition are also good. For example, the thermoplastic composition may exhibit a tensile strength of from about 20 to about 500 MPa, in some embodiments from about 50 to about 400 MPa, and in some embodiments, from about 100 to about 350 MPa; a tensile break strain of about 0.5% or more, in some embodiments from about 0.6% to about 10%, and in some embodiments, from about 0.8% to about 3.5%; and/or a tensile modulus of from about 5,000 MPa to about 25,000 MPa, in some embodiments from about 8,000 MPa to about 22,000 MPa, and in some embodiments, from about 10,000 MPa to about 20,000 MPa. The tensile properties may be determined in accordance with ISO Test No. 527 (technically equivalent to ASTM D638) at 23° C. The thermoplastic composition may also exhibit a flexural strength of from about 20 to about 500 MPa, in some embodiments from about 50 to about 400 MPa, and in some embodiments, from about 100 to about 350 MPa; a flexural break strain of about 0.5% or more, in some embodiments from about 0.6% to about 10%, and in some embodiments, from about 0.8% to about 3.5%; and/or a flexural modulus of from about 5,000 MPa to about 25,000 MPa, in some embodiments from about 8,000 MPa to about 22,000 MPa, and in some embodiments, from about 10,000 MPa to about 20,000 MPa. The flexural properties may be determined in accordance with ISO Test No. 178 (technically equivalent to ASTM D790) at 23° C.

II. Injection Molding

As indicated above, the thermoplastic composition of the present invention is particularly well suited for use in injection molding operations. For example, as is known in the art, injection can occur in two main phases—i.e., an injection phase and holding phase. During the injection phase, the mold cavity is completely filled with the molten thermoplastic composition. The holding phase is initiated after completion of the injection phase in which the holding pressure is controlled to pack additional material into the cavity and compensate for volumetric shrinkage that occurs during cooling. After the shot has built, it can then be cooled. Once cooling is complete, the molding cycle is completed when the mold opens and the part is ejected, such as with the assistance of ejector pins within the mold.

Any suitable injection molding equipment may generally be employed in the present invention. Referring to FIG. 1, for example, one embodiment of an injection molding apparatus or tool 10 that may be employed in the present invention is shown. In this embodiment, the apparatus 10 includes a first mold base 12 and a second mold base 14, which together define an article or component-defining mold cavity 16. The molding apparatus 10 also includes a resin flow path that extends from an outer exterior surface 20 of the first mold half 12 through a sprue 22 to a mold cavity 16. The resin flow path may also include a runner and a gate, both of which are not shown for purposes of simplicity. The thermoplastic composition may be supplied to the resin flow path using a variety of techniques. For example, the thermoplastic composition may be supplied (e.g., in the form of pellets) to a feed hopper attached to an extruder barrel that contains a rotating screw (not shown). As the screw rotates, the pellets are moved forward and undergo pressure and friction, which generates heat to melt the pellets. Additional heat may also be supplied to the composition by a heating medium that is communication with the extruder barrel. One or more ejector pins 24 may also be employed that are slidably secured within the second mold half 14 to define the mold cavity 16 in the closed position of the apparatus 10. The ejector pins 24 operate in a well-known fashion to remove a molded part from the cavity 16 in the open position of the molding apparatus 10.

A cooling mechanism may also be provided to solidify the resin within the mold cavity. In FIG. 1, for instance, the mold bases 12 and 14 each include one or more cooling lines 18 through which a cooling medium flows to impart the desired mold temperature to the surface of the mold bases for solidifying the molten material. Due to the unique crystallization properties of the thermoplastic composition, the "cooling time" during a molding cycle can be substantially reduced while still achieving the same degree of crystallization. The cooling time can be represented by the "normalized cooling ratio", which is determined by dividing the total cooling time by the average thickness of the molded part. As a result of the present invention, for example, the normalized cooling ratio may range from about 0.2 to about 8 seconds per millimeter, in some embodiments from about 0.5 to about 6 seconds per millimeter, and in some embodiments, from about 1 to about 5 seconds per millimeter. The total cooling time can be determined from the point when the composition is injected into the mold cavity to the point that it reaches an ejection temperature at which it can be safely ejected. Exemplary cooling times may range, for instance, from about 1 to about 60 seconds, in some embodiments from about 5 to about 40 seconds, and in some embodiments, from about 10 to about 35 seconds.

In addition to minimizing the required cooling time for a molding cycle, the method and composition of the present invention can also allow parts to be molded at lower temperatures while still achieving the same degree of crystallization. For example, the mold temperature may be from about 50° C. to about 120° C., in some embodiments from about 60° C. to about 110° C., and in some embodiments, from about 70° C. to about 90° C. Such low mold temperatures may be accomplished using cooling mediums that are less corrosive and expensive than some conventional techniques. For example, liquid water may be employed as a cooling medium.

As a result of the injection technique employed in the present invention, it has been discovered that the thermoplastic composition can be readily formed into parts having a small dimensional tolerance. For example, the thermoplastic composition may be molded into a part for use in an electronic component. The part may be in the form of a planar substrate having a thickness of about 100 millimeters or less, in some embodiments about 50 millimeters or less, in some embodiments from about 100 micrometers to about 10 millimeters, and in some embodiments, from about 200 micrometers to about 1 millimeter. Alternatively, the part may simply possess certain features (e.g., walls, ridges, etc.) within the thickness ranges noted above. Examples of electronic components that may employ such a molded part include, for instance, cellular telephones, laptop computers, small portable computers (e.g., ultraportable computers, netbook computers, and tablet computers), wrist-watch devices, pendant devices, headphone and earpiece devices, media players with wireless communications capabilities, handheld computers (also sometimes called personal digital assistants), remote controllers, global positioning system (GPS) devices, handheld gaming devices, battery covers, speakers, camera modules, integrated circuits (e.g., SIM cards), etc.

Wireless electronic devices, however, are particularly suitable. Examples of suitable wireless electronic devices may include a desktop computer or other computer equipment, a portable electronic device, such as a laptop computer or small portable computer of the type that is sometimes referred to as "ultraportables." In one suitable arrangement, the portable electronic device may be a handheld electronic device. Examples of portable and handheld electronic devices may include cellular telephones, media players with wireless communications capabilities, handheld computers (also sometimes called personal digital assistants), remote controls, global positioning system ("GPS") devices, and handheld gaming devices. The device may also be a hybrid device that combines the functionality of multiple conventional devices. Examples of hybrid devices include a cellular telephone that includes media player functionality, a gaming device that includes a wireless communications capability, a cellular telephone that includes game and email functions, and a handheld device that receives email, supports mobile telephone calls, has music player functionality and supports web browsing.

Figure 2:
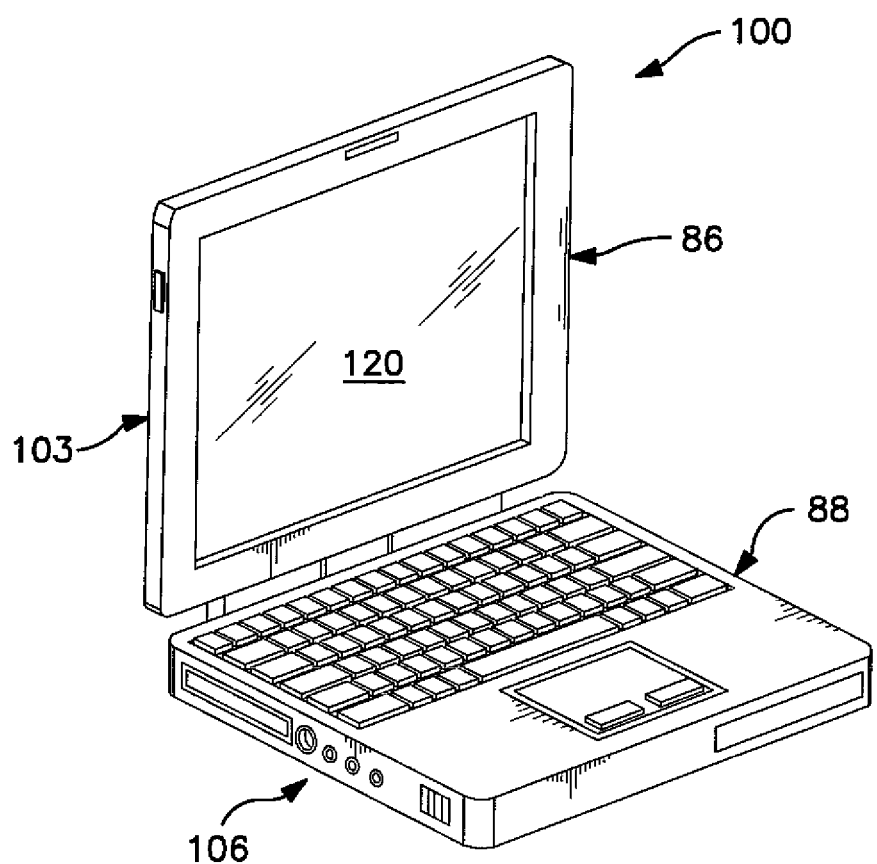
FIG. 2 is a perspective view of an electronic device that can be formed in accordance with one embodiment of the present invention.
Figure 3:
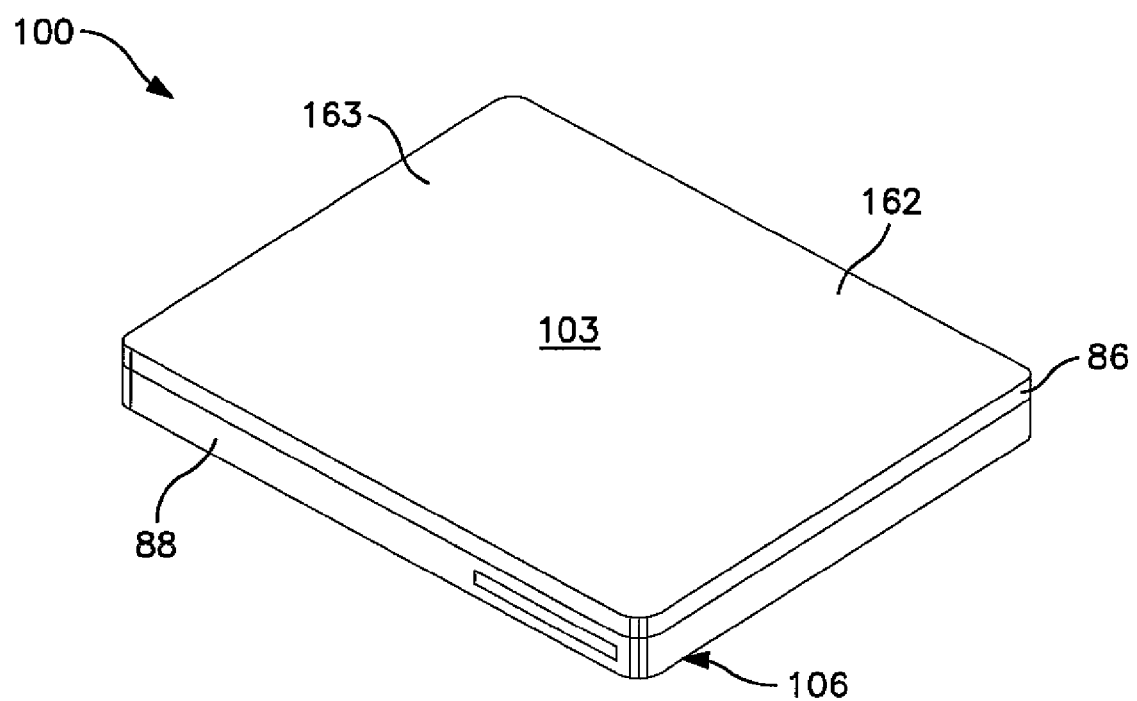
FIG. 3 is a perspective view of the electronic device of FIG. 2, shown in closed configuration.

Referring to FIGS. 2-3, one particular embodiment of an electronic device 100 is shown as a portable computer. The electronic device 100 includes a display member 103, such as a liquid crystal diode (LCD) display, an organic light emitting diode (OLED) display, a plasma display, or any other suitable display. In the illustrated embodiment, the device is in the form of a laptop computer and so the display member 103 is rotatably coupled to a base member 106. It should be understood, however, that the base member 106 is optional and can be removed in other embodiments, such as when device is in the form of a tablet portable computer. Regardless, in the embodiment shown in FIGS. 2-3, the display member 103 and the base member 106 each contain a housing 86 and 88, respectively, for protecting and/or supporting one or more components of the electronic device 100. The housing 86 may, for example, support a display screen 120 and the base member 106 may include cavities and interfaces for various user interface components (e.g., keyboard, mouse, and connections to other peripheral devices). Although the thermoplastic composition of the present invention may generally be employed to form any portion of the electronic device 100, for example for forming the cooling fan, it is typically employed to form all or a portion of the housing 86 and/or 88. When the device is a tablet portable computer, for example, the housing 88 may be absent and the thermoplastic composition may be used to form all or a portion of the housing 86. Regardless, due to the unique properties achieved by the present invention, the housing(s) or a feature of the housing(s) may be molded to have a very small wall thickness, such as within the ranges noted above.

Although not expressly shown, the device 100 may also contain circuitry as is known in the art, such as storage, processing circuitry, and input-output components. Wireless transceiver circuitry in circuitry may be used to transmit and receive radio-frequency (RF) signals. Communications paths such as coaxial communications paths and microstrip communications paths may be used to convey radio-frequency signals between transceiver circuitry and antenna structures. A communications path may be used to convey signals between the antenna structure and circuitry. The communications path may be, for example, a coaxial cable that is connected between an RF transceiver (sometimes called a radio) and a multiband antenna.

The thermoplastic composition may forms components for other applications as well. For example, one component that may incorporate a molded part of the present invention is a liquid pump (e.g., water pump). The liquid pump may be a direct lift pump, positive displacement pump (e.g., rotary, reciprocating, or linear), rotodynamic pump (e.g., centrifugal), gravity pump, etc. Rotodynamic pumps, in which energy is continuously imparted to the pumped fluid by a rotating impeller, propeller, or rotor, are particularly suitable. In a centrifugal pump, for instance, fluid enters a pump impeller along or near to the rotating axis and is accelerated by the impeller, flowing radially outward into a diffuser or volute chamber, from which it exits into the downstream piping. Such pumps are often used in automotive applications to move a coolant through the engine. Due to the high temperatures associated with automotive engines, the thermoplastic composition of the present invention is particularly well suited for use in the centrifugal pumps of such automotive cooling systems. In certain embodiments, for example, all or a portion (e.g., blades) of the water impeller may be formed from the thermoplastic composition of the present invention. Centrifugal pumps also generally include a housing that encloses certain components of the pump and protects them from heat, corrosion, etc. In some embodiments, some or all of the housing may be formed from the thermoplastic composition of the present invention.

Figure 4:
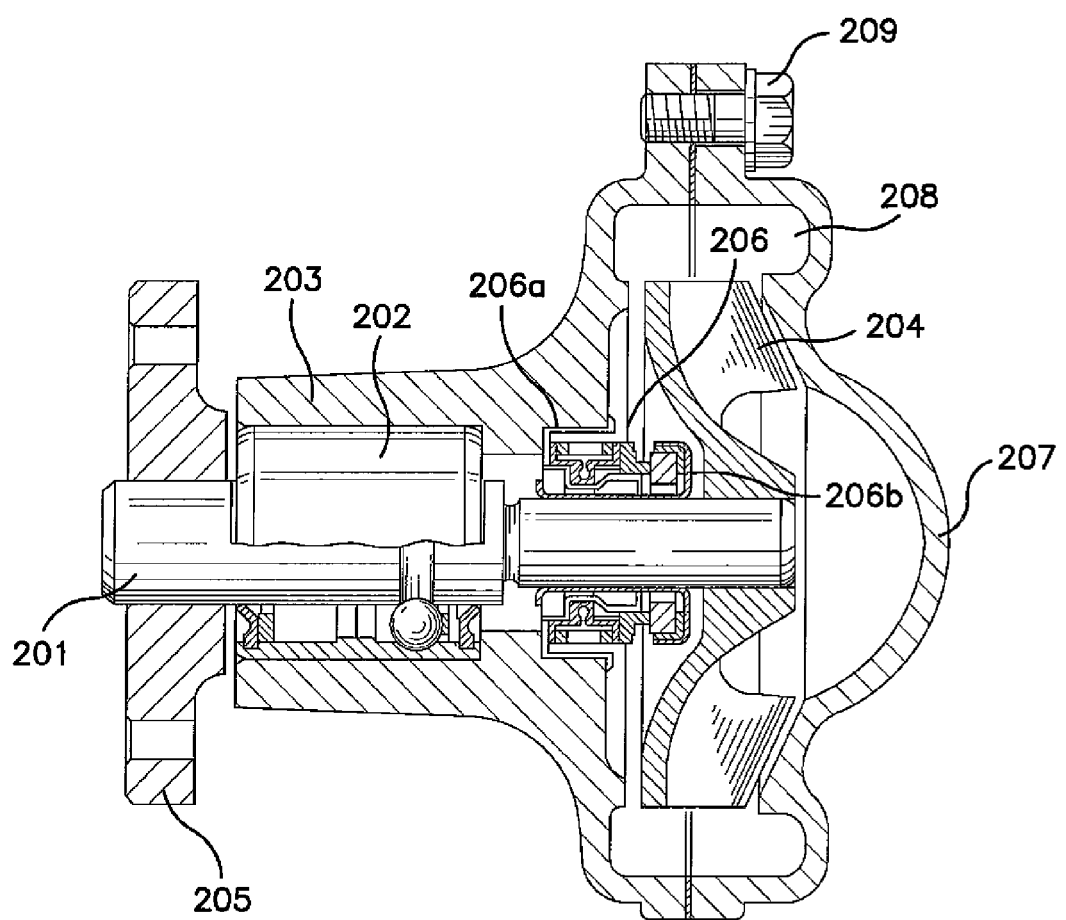
FIG. 4 illustrates a water pump that may be formed in accordance with one embodiment of the present invention.

Referring to FIG. 4, one particular example of a centrifugal pump is shown that can employ the thermoplastic composition of the present invention. In the illustrated embodiment, the pump contains a rotary shaft 201 supported on a housing 203 via a bearing 202. A pump impeller 204, which may contain the thermoplastic composition of the present invention, is rigidly fixed at an end of the rotary shaft 201. A pulley hub 205 is also rigidly fixed on the base end portion of the rotary shaft 201. Between the bearing 202 and the pump impeller 204, a mechanical seal 206 is formed that is constituted by a stationary member 206a fixed on the side of the housing 203 and a rotary member 206b fixedly engaged with the rotary shaft 201. The pump may also include a housing 207, which can contain the thermoplastic composition of the present invention. The housing 207 may be affixed to the pump housing 203 (e.g., with fastening bolts) so that a volute chamber 208 is defined therebetween. While not illustrated, a suction portion and a discharge port may also be provided within the housing 207.

Of course, the thermoplastic composition is not limited to the formation of water pumps or portions thereof, and it may be utilized in forming all manner of components as may be incorporated in a fluid handling system including pipes and sections of pipes, flanges, valves, valve seats, seals, sensor housings, thermostats, thermostat housings, diverters, linings, propellers, cooling fans, and so forth.

The present invention may be better understood with reference to the following examples.

Test Methods

Melt Viscosity:

The melt viscosity is determined as scanning shear rate viscosity and determined in accordance with ISO Test No. 11443 (technically equivalent to ASTM D3835) at a shear rate of 1200 s$^{-1}$ and at a temperature of 316° C. using a Dynisco 7001 capillary rheometer. The rheometer orifice (die) had a diameter of 1 mm, a length of 20 mm, an L/D ratio of 20.1, and an entrance angle of 180°. The diameter of the barrel was 9.55 mm+0.005 mm and the length of the rod was 233.4 mm.

Thermal Properties:

The thermal properties are determined by differential scanning calorimetry ("DSC") in accordance with ISO Test No. 11357. Under the DSC procedure, samples are heated and cooled at 20° C. per minute as stated in ISO Standard 10350 using DSC measurements conducted on a TA Q100 Instrument. For both pellet and mold samples, the heating and cooling program is a 2-cycle test that begins with an equilibration of the chamber to 25° C., followed by a first heating period at a heating rate of 20° C. per minute to a temperature of 320° C., followed by equilibration of the sample at 320° C. for 1 minutes, followed by a first cooling period at a cooling rate of 20° C. per minute to a temperature of 50° C., followed by equilibration of the sample at 50° C. for 1 minute, and then a second heating period at a heating rate of 20° C. per minute to a temperature of 320° C. The results are evaluated using a TA software program, which identifies and quantifies the melting temperature, the endothermic and exothermic peaks, and the areas under the peaks on the DSC plots. The areas under the peaks on the DSC plots are determined in terms of joules per gram of sample (J/g). For example, the heat of fusion of a resin or mold sample is determined by integrating the area of the endothermic peak. The area values are determined by converting the areas under the DSC plots (e.g., the area of the endotherm) into the units of joules per gram (J/g) using computer software. The exothermic heat of crystallization is determined during the first cooling cycle and the second heating cycle. The percent crystallization potential may also be calculated as follows:

% crystallization potential=100*(A−B)/A wherein,

A is the sum of endothermic peak areas (e.g., 1st heat of fusion); and

B is the sum of exothermic peak areas (e.g., pre-crystallization heat of fusion).

Tensile Modulus, Tensile Stress, and Tensile Elongation:

Tensile properties are tested according to ISO Test No. 527 (technically equivalent to ASTM D638). Modulus and strength measurements are made on the same test strip sample having a length of 80 mm, thickness of 10 mm, and width of 4 mm. The testing temperature is 23° C., and the testing speeds are 1 or 5 mm/min.

Flexural Modulus, Flexural Stress, and Flexural Strain:

Flexural properties are tested according to ISO Test No. 178 (technically equivalent to ASTM D790). This test is performed on a 64 mm support span. Tests are run on the center portions of uncut ISO 3167 multi-purpose bars. The testing temperature is 23° C. and the testing speed is 2 mm/min.

Izod Notched Impact Strength:

Notched Izod properties are tested according to ISO Test No. 180 (technically equivalent to ASTM D256, Method A). This test is run using a Type A notch. Specimens are cut from the center of a multi-purpose bar using a single tooth milling machine. The testing temperature is 23° C.

Deflection Under Load Temperature ("DTUL"):

The deflection under load temperature is determined in accordance with ISO Test No. 75-2 (technically equivalent to ASTM D648-07). A test strip sample having a length of 80 mm, thickness of 10 mm, and width of 4 mm is subjected to an edgewise three-point bending test in which the specified load (maximum outer fibers stress) is 1.8 MPa. The specimen is lowered into a silicone oil bath where the temperature is raised at 2° C. per minute until it deflects 0.25 mm (0.32 mm for ISO Test No. 75-2).

Flash:

To determine flash, the sample is initially dried at 135° C. for 3 to 4 hours. The sample is then injection molded into a dual tab flash mold using the following conditions: melt temperature of 321° C., injection time of 1.5 seconds, injection pressure of 30,000 psi, hold time and pressure of 10 seconds at 1,000 psi, and screw retraction time of 20 seconds. More particularly, the sample is injected so that 0.5 inches of one tab is filled in 1.5 seconds with resin and 0.75 inches of the other tab remains unfilled. After cooling, the flash of the parts is measured with a MediaCybernetics automated image analysis system.

Synthesis of N1,N4-diphenylterephthalamide

Compound A

The synthesis of Compound A from terephthaloyl chloride and aniline can be performed according to the following scheme:

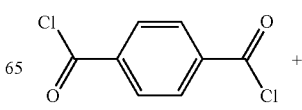

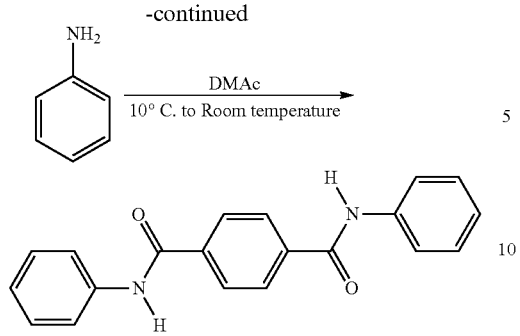

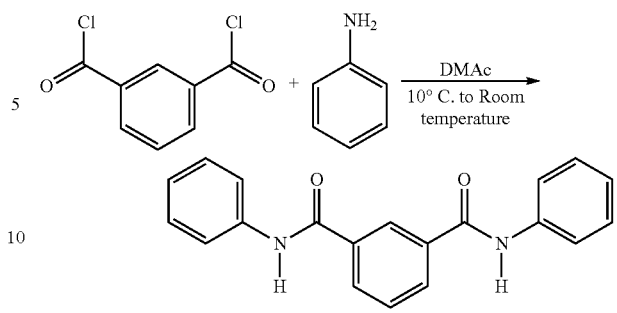

The experimental set up consists of a 2 L glass beaker equipped with a glass rod stirrer coupled with an overhead mechanical stirrer. Dimethyl acetamide ("DMAc") (3 L) is added to the beaker and the beaker is immersed in an ice bath to cool the system to 10-15° C. Then aniline (481.6 g) is added to the solvent with constant stirring, the resultant mixture is cooled to 10-15° C. Terephthaloyl chloride (300 g) is added gradually to the cooled stirred mixture such that the temperature of the reaction is maintained below 30° C. The acid chloride is added over a period of one-two hours, after which the mixture is stirred for another three hours at 10-15° C. and then at room temperature overnight. The reaction mixture is milky white (a fine suspension of the product in the solvent) and is vacuum filtered using a filter paper and a Buchner funnel. The crude product is washed with acetone (2 L) and then washed with hot water (2 L). The product is then air dried over night at room temperature and then is dried in a vacuum oven 150° C. for 4-6 hours. The product (464.2 g) is a highly crystalline white solid. The melting point is 346-348° C. as determined by differential scanning calorimetry ("DSC").

The experimental set up consists of a 2 L glass beaker equipped with a glass rod stirrer coupled with an overhead mechanical stirrer. DMAc (1.5 L) is added to the beaker and the beaker is immersed in an ice bath to cool the solvent to 10-15° C. Then aniline (561.9 g) is added to the solvent with constant stirring, the resultant mixture is cooled to 10-15° C. Isophthaloyl chloride (350 g dissolved in 200 g of DMAc) is added gradually to the cooled stirred mixture such that the temperature of the reaction is maintained below 30° C. The acid chloride is added over a period of one hour, after which the mixture is stirred for another three hours at 10-15° C. and then at room temperature overnight. The reaction mixture is milky white in appearance. The product is recovered by precipitation by addition of 1.5 L of distilled water and followed by is vacuum filtration using a filter paper and a Buchner funnel. The crude product is then washed with acetone (2 L) and then washed again with hot water (2 L). The product is then air dried over night at room temperature and then dried in a vacuum oven 150° C. for 4-6 hours. The product (522 g) was a white solid. The melting point is 290° C. as determined by DSC.

Synthesis of N4-phenyl-N1-[4-[[4-(phenylcarbamoyl)benzoyl]amino]phenyl]terephthalamide Compound E The synthesis of Compound E from 4-amino benzanilide and terephthaloyl chloride can be performed according to the following scheme:

Synthesis of N1,N4-diphenylisoterephthanalide

Compound B

The synthesis of Compound B from isophthaloyl chloride and aniline is performed according to the following scheme:

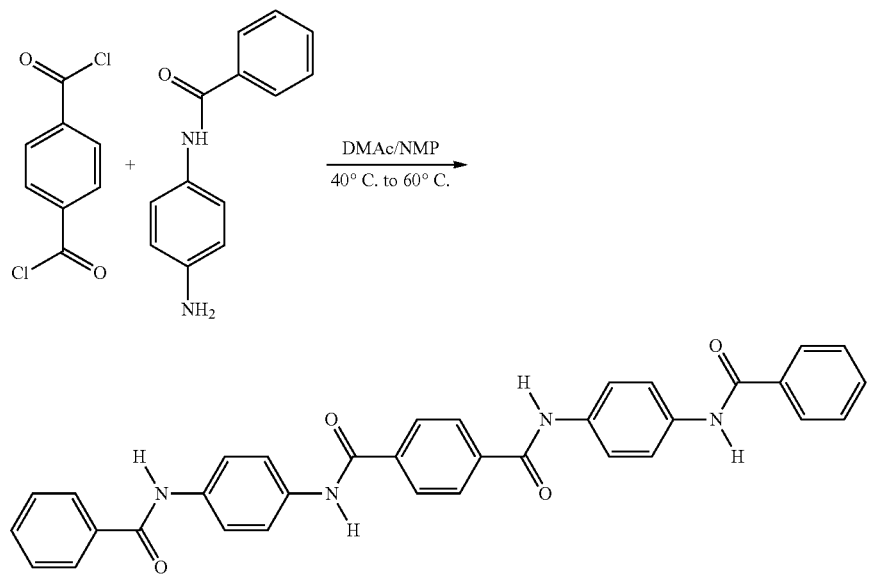

The experimental setup consisted of a 1 L glass beaker equipped with a glass rod stirrer coupled with an overhead mechanical stirrer. 4-aminobenzanilide (20.9 g) is dissolved in warm DMAc (250 mL) (alternatively N-methylpyrrolidone can also be used). Terephthaloyl chloride (10 g) is added to the stirred solution of the diamine maintained at 40-50° C., upon the addition of the acid chloride the reaction temperature increased from 50° C. to 80° C. After the addition of the acid chloride is completed, the reaction mixture is warmed to 70-80° C. and maintained at that temperature for about three hours and allowed to rest overnight at room temperature. The product is then isolated by the addition of water (500 mL) followed by vacuum filtration followed by washing with hot water (1 L). The product is then dried in a vacuum oven at 150° C. for about 6-8 hours, to give a pale yellow colored solid (yield ca. 90%). The melting point by DSC is 462° C.

Synthesis of
N1,N3,N5-triphenylbenzene-1,3,5-tricarboxamide

Compound J

Compound J can be synthesized from trimesoyl chloride and aniline according to the following scheme:

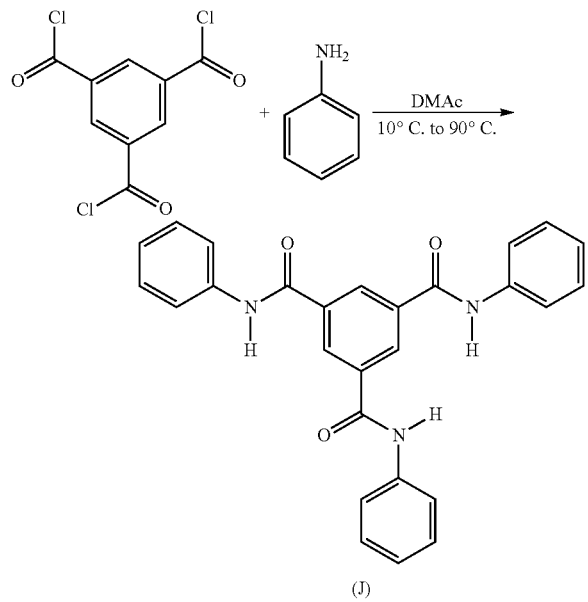

(J)

The experimental set up consists of a 2 L glass beaker equipped with a glass rod stirrer coupled with an overhead mechanical stirrer. Trimesoyl chloride (200 g) is dissolved in dimethyl acetamide ("DMAc") (1 L) and cooled by an ice bath to 10-20° C. Aniline (421 g) is added drop wise to a stirred solution of the acid chloride over a period of 1.5 to 2 hours. After the addition of the amine is completed, the reaction mixture is stirred additionally for 45 minutes, after which the temperature is increased to 90° C. for about 1 hour. The mixture is allowed to rest overnight at room temperature. The product is recovered by precipitation through the addition of 1.5 L of distilled water, which is followed by is vacuum filtration using a filter paper and a Buchner funnel. The crude product is washed with acetone (2 L) and then washed again with hot water (2 L). The product is then air dried over night at room temperature and then is dried in a vacuum oven 150° C. for 4 to 6 hours. The product (250 g) is a white solid, and has a melting point of 319.6° C. as determined by DSC.

Synthesis of 1,3-Benzenedicarboxamide, N1,N3-dicyclohexyl-Compound O1

The synthesis of Compound O1 from isophthaloyl chloride and cyclohexyl amine can be performed according to the following scheme:

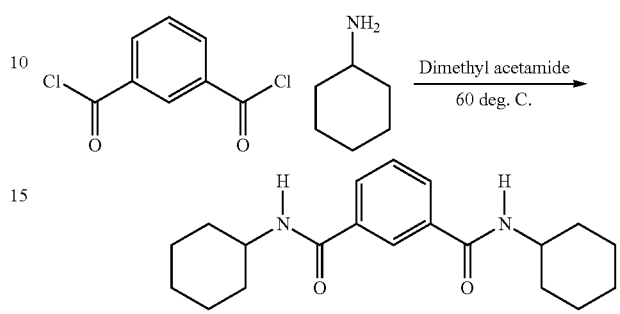

The experimental set up consisted of a 1 L glass beaker equipped with a glass rod stirrer coupled with an overhead mechanical stirrer. Cyclohexyl amine (306 g) was mixed in dimethyl acetamide (1 L) (alternatively N-methylpyrrolidone can also be used) and triethyl amine (250 g) at room temperature. Next isopthaloyl chloride (250 g) was slowly added over a period of 1.5 to 2 hours, to the amine solution with constant stirring. The rate of addition of the acid chloride was maintained such that the reaction temperature was maintained less than 60° C. After complete addition of the benzoyl chloride, the reaction mixture was gradually warmed to 85-90° C. and then allowed to cool to around 45-50° C. The mixture was allowed to rest overnight (for at least 3 hours) at room temperature. The product was recovered by precipitation through the addition of 1.5 L of distilled water, which was followed by was vacuum filtration using a filter paper and a Buchner funnel. The crude product was then washed with acetone (250 mL) and washed again with hot water (500 mL). The product (yield: ca. 90%) was then air dried over night at room temperature and then was dried in a vacuum oven 150° C. for 4 to 6 hours. The product was a white solid. The Proton NMR characterization was as follows: $^1$H NMR (400 MHz $d_6$-DMSO): 8.3 (s, 2H, CONH), 8.22 (s, 1H, Ar), 7.9 (d, 2H, Ar), 7.5 (s, 1H, Ar), 3.7 (broad s, 2H, cyclohexyl), 1.95-1.74 broad s, 4H, cyclohexyl) and 1.34-1.14 (m, 6H, cyclohexyl).

Example 1

The components listed in Table 1 below are mixed in a Werner Pfleiderer ZSK 25 co-rotating intermeshing twin-screw extruder with an 18 mm diameter.

TABLE 1

| | Sample Components | | | | |
|---|---|---|---|---|---|
| Sample | FORTRON® 0205 PPS (wt. %) | Compound A (wt. %) | Compound B (wt. %) | Compound E (wt. %) | Compound J (wt. %) |
| Control | 100 | — | — | — | — |
| 1 | 98.0 | 2.0 | — | — | — |
| 2 | 98.0 | — | 2.0 | — | — |
| 3 | 98.0 | — | — | 2.0 | — |
| 4 | 98.0 | — | — | — | 2.0 |

The thermal properties of pellets formed from Samples 1, 2, and 4 are determined, the results of which are set forth below in Table 2.

TABLE 2

Thermal Properties

| Sample | MV (poise) | Pre-Cryst Melt Temp (° C.) | Pre-Cryst Heat of Fusion (J/g) | 1st Heat, Melt Temp (° C.) | 1st Heat of Fusion (J/g) | 2nd Heat, Melt Temp (° C.) | 2nd Heat of Fusion (J/g) | Re-Cryst Temp (° C.) | Re-Cryst Heat of Fusion (J/g) | Cryst Potential (%) |
|---|---|---|---|---|---|---|---|---|---|---|
| Control | 504 | 126.3 | 23.9 | 282.2 | 39.3 | 280.9 | 38.5 | 233.2 | 45.0 | 39 |
| 1 | 494 | 122.9 | 19.1 | 281.4 | 45.3 | 279.6 | 44.8 | 231.8 | 43.5 | 58 |
| 2 | 470 | 123.0 | 24.8 | 280.1 | 43.8 | 279.5 | 44.2 | 230.7 | 46.8 | 43 |
| 4 | 447 | 125.9 | 24.5 | 280.5 | 41.8 | 279.9 | 43.7 | 231.8 | 46.5 | 41 |

As indicated above, the addition of the aromatic amide oligomer increased the crystallization potential and reduced the crystallization temperature ("Re-Cryst Temp"). Samples 1, 2, and 4 are also molded into T-bars on a Mannesmann Demag D100 NCIII injection molding machine at a mold temperature of 130° C. The thermal properties are tested, the results of which are set forth below in Table 3.

TABLE 3

Thermal Properties

| Sample | Pre-Cryst Melt Temp (° C.) | Pre-Cryst Heat of Fusion (J/g) | 1st Heat, Melt Temp (° C.) | 1st Heat of Fusion (J/g) | 2nd Heat, Melt Temp (° C.) | 2nd Heat of Fusion (J/g) | Re-Cryst Temp (° C.) | Re-Cryst Heat of Fusion (J/g) | Cryst Potential (%) |
|---|---|---|---|---|---|---|---|---|---|
| Control | 107.7 | 9.0 | 285.8 | 42.3 | 282.1 | 38.7 | 207.7 | 43.8 | 78.8 |
| 1 | 105.6 | 3.7 | 286.1 | 44.4 | 282.8 | 42.8 | 226.3 | 41.4 | 91.7 |
| 2 | 106.7 | 11.3 | 283.3 | 47.6 | 280.1 | 41.6 | 212.8 | 45.3 | 76.2 |
| 4 | 107.1 | 6.8 | 282.5 | 45.3 | 280.3 | 40.7 | 203.3 | 43.0 | 85.0 |

Both pellet and molded samples exhibited an increased crystallization potential upon the addition of the aromatic amide oligomer. The mechanical properties are also tested, the results of which are set forth below in Table 4.

TABLE 4

Mechanical Properties

| Sample | Tensile modulus (1 mm/min) (MPa) | Tensile stress (5 mm/min) (MPa) | Tensile strain (5 mm/min) (%) | Flex modulus (MPa) | Flex stress at 3.5% (MPa) | Izod Notched (kJ/m²) | DTUL (° C.) |
|---|---|---|---|---|---|---|---|
| Control | 3444 | 52.5 | 1.7 | 3539 | 118.7 | 4.1 | 109.4 |
| 1 | 3849 | 73.2 | 2.4 | 3847 | 124.9 | 3.9 | 113.5 |
| 2 | 3663 | 59.5 | 1.8 | 3716 | — | 3.4 | 101.8 |
| 4 | 3579 | 73.1 | 2.4 | 3707 | 124.8 | 3.3 | 104.7 |

Example 2

The components listed in Table 5 below are mixed in a Werner Pfleiderer ZSK 25 co-rotating intermeshing twin-screw extruder with an 18 mm diameter.

TABLE 5

Sample Components

| Sample | FORTRON ® 0205 PPS (wt. %) | Compound A (wt. %) | Compound E (wt. %) |
|---|---|---|---|
| Control | 100 | — | — |
| 5 | 99.5 | 0.5 | — |
| 6 | 98.0 | 2.0 | — |
| 7 | 97.0 | 3.0 | — |
| 8 | 98.0 | — | 2.0 |

Once formed, the samples are molded into T-bars on a Mannesmann Demag D100 NCIII injection molding machine. The mechanical properties are tested, the results of which are set forth below in Table 6.

TABLE 6

| | | | | Mechanical Properties | | | | |
|---|---|---|---|---|---|---|---|---|
| Sample | MV (poise) | Tensile modulus (1 mm/min) (MPa) | Tensile stress (5 mm/min) (MPa) | Tensile strain (5 mm/min) (%) | Flex modulus (MPa) | Flex stress (MPa) | Izod Notched (kJ/m$^2$) | DTUL (° C.) |
| Control | 504 | 3444 | 52.5 | 1.7 | 3539 | 118.7 | 4.1 | 109.4 |
| 5 | 522 | 3858 | 63.2 | 1.8 | 3847 | 119.0 | 3.1 | 109.5 |
| 6 | 494 | 3849 | 73.2 | 2.4 | 3847 | 124.9 | 3.9 | 113.5 |
| 7 | 457 | 4006 | 73.4 | 2.3 | 3923 | 125.2 | 3.5 | 118.1 |
| 8 | 551 | 3817 | 59.5 | 1.7 | 3798 | 129.3 | 2.8 | 112.1 |

Example 3

The components listed in Table 7 below are mixed in a Werner Pfleiderer ZSK 25 co-rotating intermeshing twin-screw extruder with an 18 mm diameter.

TABLE 7

| | | | Sample Components | | | | |
|---|---|---|---|---|---|---|---|
| Sample | FORTRON ® 0205 PPS (wt. %) | Compound A (wt. %) | Compound E (wt. %) | Boron Nitride (wt. %) | Glycolube P (wt. %) | Aminosilane (wt. %) | Glass Fibers (4 mm) (wt. %) |
| Control 1 | 59.3 | — | — | — | 0.3 | 0.4 | 40.0 |
| Control 2 | 59.1 | — | — | 0.2 | 0.3 | 0.4 | 40.0 |
| 9 | 58.7 | 0.6 | — | — | 0.3 | 0.4 | 40.0 |
| 10 | 58.5 | 0.6 | — | 0.2 | 0.3 | 0.4 | 40.0 |
| 11 | 58.1 | 1.2 | — | — | 0.3 | 0.4 | 40.0 |
| 12 | 58.1 | — | 1.2 | — | 0.3 | 0.4 | 40.0 |

The thermal properties of pellets formed from the samples are determined, the results of which are set forth below in Table 8.

TABLE 8

| | | | | Thermal Properties | | | | | | |
|---|---|---|---|---|---|---|---|---|---|---|
| Sample | MV (poise) | Pre-Cryst Melt Temp (° C.) | Pre-Cryst Heat of Fusion (J/g) | 1$^{st}$ Heat, Melt Temp (° C.) | 1$^{st}$ Heat of Fusion (J/g) | 2$^{nd}$ Heat, Melt Temp (° C.) | 2$^{nd}$ Heat of Fusion (J/g) | Re-Cryst Temp (° C.) | Re-Cryst Heat of Fusion (J/g) | Cryst Potential (%) |
| Control 1 | 2648 | 126.1 | 11.1 | 280.9 | 22.7 | 277.4 | 22.2 | 214.3 | 23.1 | 51.1 |
| Control 2 | 2590 | 124.8 | 8.2 | 281.0 | 21.3 | 280.8 | 21.4 | 236.5 | 23.6 | 61.4 |
| 9 | 2756 | 124.5 | 6.5 | 281.2 | 22.7 | 280.0 | 20.0 | 230.5 | 23.5 | 71.2 |
| 10 | 2740 | 122.7 | 10.3 | 279.9 | 24.1 | 280.1 | 22.1 | 237.3 | 24.5 | 83.3 |
| 11 | 2434 | 124.4 | 10.3 | 279.9 | 24.8 | 278.8 | 22.6 | 230.4 | 23.5 | 58.8 |
| 12 | 2358 | 121.8 | 8.2 | 282.2 | 22.2 | 279.1 | 21.2 | 226.3 | 23.9 | 63.2 |

As indicated above, the addition of the aromatic amide oligomer increased the crystallization potential of the composition. The pellets are also molded into T-bars on a Mannesmann Demag D100 NCIII injection molding machine. The thermal properties are tested, the results of which are set forth below in Table 9.

TABLE 9

| | Thermal Properties | | | | | | | | | |
|---|---|---|---|---|---|---|---|---|---|---|
| Sample | Pre-Cryst Melt Temp (°C.) | Pre-Cryst Heat of Fusion (J/g) | 1$^{st}$ Heat, Melt Temp (°C.) | 1$^{st}$ Heat of Fusion (J/g) | 2$^{nd}$ Heat, Melt Temp (°C.) | 2$^{nd}$ Heat of Fusion (J/g) | Re-Cryst Temp (°C.) | Re-Cryst Heat of Fusion (J/g) | Cryst Potential (%) | Flash (mm) |
| Control 1 | 105.7 | 2.6 | 281.8 | 23.4 | 277.8 | 22.4 | 217.1 | 24.9 | 88.9 | 0.21 |
| Control 2 | 105.0 | 3.2 | 281.2 | 23.7 | 281.2 | 21.9 | 239.9 | 24.5 | 86.4 | 0.17 |
| 9 | 104.7 | 2.7 | 281.7 | 23.6 | 279.8 | 22.3 | 234.1 | 24.9 | 88.6 | 0.14 |
| 10 | 105.6 | 3.6 | 281.6 | 24.5 | 280.9 | 23.4 | 240.0 | 25.3 | 85.2 | 0.12 |
| 11 | 104.5 | 2.1 | 280.8 | 23.4 | 281.1 | 23.3 | 239.9 | 24.4 | 91.1 | 0.19 |
| 12 | 104.4 | 3.2 | 281.8 | 23.3 | 279.1 | 21.6 | 230.6 | 25.3 | 86.1 | 0.20 |

As indicated, the samples containing the aromatic amide oligomer (Samples 9-12) exhibited a lower amount of flash than Control 1 (no nucleating agents). The mechanical properties are also tested, the results of which are set forth below in Table 10.

TABLE 10

| | Mechanical Properties | | | | | | | |
|---|---|---|---|---|---|---|---|---|
| Sample | Tensile modulus (1 mm/min) (MPa) | Tensile stress (5 mm/min) (MPa) | Tensile strain (5 mm/min) (%) | Flex modulus (MPa) | Flex stress at 3.5% (MPa) | Flex Strain (%) | Izod Notched (kJ/m$^2$) | DTUL (°C.) |
| Control 1 | 15,654 | 201.2 | 1.8 | 14,920 | 304.0 | 2.3 | 10.7 | 264.5 |
| Control 2 | 15,548 | 202.1 | 1.8 | 14,978 | 304.6 | 2.3 | 10.0 | 266.6 |
| 9 | 15,998 | 205.9 | 1.8 | 15,417 | 301.8 | 2.2 | 9.6 | 269.7 |
| 10 | 16,047 | 207.1 | 1.8 | 15,560 | 302.0 | 2.2 | 10.2 | 266.7 |
| 11 | 15,858 | 200.9 | 1.8 | 15,326 | 291.0 | 2.1 | 9.0 | 269.7 |
| 12 | 15,710 | 199.9 | 1.8 | 15,269 | 283.2 | 2.0 | 9.2 | 268.0 |

Example 4

The components listed in Table 11 below are mixed in a Werner Pfleiderer ZSK 25 co-rotating intermeshing twin-screw extruder with a 25 mm diameter.

TABLE 11

| | Sample Components | | | | | | |
|---|---|---|---|---|---|---|---|
| Sample | FORTRON® 0202 PPS (wt. %) | FORTRON® 0203 PPS (wt. %) | Compound A (wt. %) | Boron Nitride (wt. %) | Glycolube P (wt. %) | Amino-silane (wt. %) | Glass Fibers (4 mm) (wt. %) |
| Control 3 | 59.3 | | — | — | 0.3 | 0.4 | 40.0 |
| Control 4 | | 59.3 | — | | 0.3 | 0.4 | 40.0 |
| 13 | 58.6 | | 0.6 | 0.1 | 0.3 | 0.4 | 40.0 |
| 14 | | 58.6 | 0.6 | 0.1 | 0.3 | 0.4 | 40.0 |

| Sample | FORTRON® 0214 PPS (wt. %) | Compound A (wt. %) | Boron Nitride (wt. %) | 2,2'-Dithiodibenzoic acid (wt. %) | Glycolube P (wt. %) | Amino-silane (wt. %) | Glass Fibers (4 mm) (wt. %) |
|---|---|---|---|---|---|---|---|
| 15 | 58.1 | 0.6 | 0.1 | 0.5 | 0.3 | 0.4 | 40.0 |
| 16 | 57.6 | 0.6 | 0.1 | 1.0 | 0.3 | 0.4 | 40.0 |

The thermal properties of pellets formed from the samples are determined, the results of which are set forth below in Table 12.

TABLE 12

Thermal Properties

| Sample | MV (kpoise) | Pre-Cryst Melt Temp (° C.) | Pre-Cryst Heat of Fusion (J/g) | $1^{st}$ Heat, Melt Temp (° C.) | $1^{st}$ Heat of Fusion (J/g) | $2^{nd}$ Heat, Melt Temp (° C.) | $2^{nd}$ Heat of Fusion (J/g) | Re-Cryst Temp (° C.) | Re-Cryst Heat of Fusion (J/g) | Cryst Potential (%) |
|---|---|---|---|---|---|---|---|---|---|---|
| Control 3 | 2.171 | 120.6 | 12.2 | 282.9 | 26.9 | 279.6 | 23.5 | 223.9 | 27.0 | 54.7 |
| Control 4 | 2.196 | 120.5 | 7.4 | 282.9 | 26.8 | 279.1 | 23.3 | 225.4 | 27.0 | 72.2 |
| 13 | 1.682 | 117.1 | 1.0 | 282.6 | 28.0 | 282.5 | 26.9 | 244.2 | 28.8 | 96.3 |
| 14 | 1.862 | 117.9 | 2.1 | 282.5 | 28.5 | 282.4 | 26.9 | 244.2 | 27.9 | 92.8 |
| 15 | 2.326 | 121.7 | 8.3 | 280.1 | 24.5 | 281.0 | 23.3 | 238.9 | 25.7 | 66.1 |
| 16 | 1.053 | 122.8 | 6.0 | 281.0 | 26.6 | 282.5 | 24.8 | 241.9 | 26.5 | 77.4 |

As indicated above, the addition of the aromatic amide oligomer increased the crystallization potential of the composition. The pellets are also molded into T-bars on a Mannesmann Demag D100 NCIII injection molding machine at 130° C. and 80° C. The thermal properties are tested, the results of which are set forth below in Tables 13 and 14.

TABLE 13

Thermal Properties on T-bars mold @ 130° C.

| Sample | Pre-Cryst Melt Temp (° C.) | Pre-Cryst Heat of Fusion (J/g) | $1^{st}$ Heat, Melt Temp (° C.) | $1^{st}$ Heat of Fusion (J/g) | $2^{nd}$ Heat, Melt Temp (° C.) | $2^{nd}$ Heat of Fusion (J/g) | Re-Cryst Temp (° C.) | Re-Cryst Heat of Fusion (J/g) | Cryst Potential (%) | Flash (mm) |
|---|---|---|---|---|---|---|---|---|---|---|
| Control 3 | 117.5 | 1.0 | 283.0 | 26.3 | 282.2 | 25.4 | 244.0 | 28.9 | 96.3 | 0.258 |
| Control 4 | 117.6 | 0.7 | 283.3 | 25.7 | 280.7 | 24.1 | 239.3 | 27.5 | 97.2 | 0.249 |
| 13 | 114.1 | 0.5 | 283.0 | 24.7 | 283.6 | 24.0 | 250.5 | 26.1 | 98.1 | 0.233 |
| 14 | 101.2 | 0.5 | 282.4 | 25.0 | 283.7 | 24.5 | 250.3 | 26.9 | 98.2 | 0.258 |
| 15 | 118.9 | 0.0 | 282.7 | 22.4 | 283.6 | 22.8 | 245.3 | 24.5 | 99.8 | 0.289 |
| 16 | 100.7 | 1.2 | 283.3 | 24.8 | 284.4 | 24.8 | 248.7 | 27.4 | 95.2 | 0.186 |

TABLE 14

Thermal Properties on T-bars mold @ 80° C.

| Sample | Pre-Cryst Melt Temp (° C.) | Pre-Cryst Heat of Fusion (J/g) | $1^{st}$ Heat, Melt Temp (° C.) | $1^{st}$ Heat of Fusion (J/g) | $2^{nd}$ Heat, Melt Temp (° C.) | $2^{nd}$ Heat of Fusion (J/g) | Re-Cryst Temp (° C.) | Re-Cryst Heat of Fusion (J/g) | Cryst Potential (%) | Flash (mm) |
|---|---|---|---|---|---|---|---|---|---|---|
| Control 3 | 104.8 | 3.2 | 283.5 | 25.3 | 280.1 | 23.5 | 224.0 | 27.0 | 87.2 | 0.065 |
| Control 4 | 106.9 | 1.7 | 283.6 | 24.1 | 280.4 | 22.9 | 233.2 | 27.2 | 92.7 | 0.079 |
| 13 | 103.2 | 1.6 | 281.9 | 26.6 | 282.4 | 26.3 | 245.7 | 28.6 | 93.9 | 0.081 |
| 14 | 103.0 | 1.5 | 282.3 | 25.7 | 282.6 | 24.3 | 248.9 | 27.2 | 94.1 | 0.059 |
| 15 | 107.1 | 2.2 | 281.5 | 24.0 | 281.4 | 22.5 | 239.7 | 25.1 | 90.6 | 0.040 |
| 16 | 104.4 | 2.4 | 282.7 | 25.3 | 283.2 | 23.5 | 243.2 | 24.9 | 90.4 | 0.004 |

As indicated, the samples containing the aromatic amide oligomer (Samples 13-16) showed higher crystallization potential and higher recrystallization temperature, indicating a faster crystallization process than Control 3 and Control 4. Samples molded at 80° C. exhibited a lower amount of flash than sampled molded at 130° C., and the crystallization potential was maintained above 90% in the presence of the aromatic amide oligomer. The mechanical properties are also tested, the results of which are set forth below in Tables 15 and 16.

TABLE 15

Mechanical Properties (at 130° C. mold)

| Sample | Tensile modulus (1 mm/min) (MPa) | Tensile stress (5 mm/min) (MPa) | Tensile strain (5 mm/min) (%) | Flex modulus (MPa) | Flex stress (MPa) | Flex Strain (%) | Izod Notched (kJ/m$^2$) | DTUL (° C.) |
|---|---|---|---|---|---|---|---|---|
| Control 3 | 15,047 | 185.1 | 1.6 | 14,686 | 272.1 | 1.9 | 9.6 | 271.2 |
| Control 4 | 14,821 | 191.2 | 1.8 | 14,408 | 275.4 | 2.0 | 10.1 | 269.3 |
| 13 | 15,725 | 184.9 | 1.5 | 15,309 | 267.7 | 1.8 | 10.7 | 272.4 |
| 14 | 15,678 | 190.5 | 1.7 | 14,863 | 273.2 | 2.0 | 9.4 | 271.0 |
| 15 | 14,808 | 175.5 | 1.8 | 14,043 | 251.5 | 2.0 | 7.3 | 262.4 |
| 16 | 14,908 | 163.5 | 1.5 | 13,410 | 243.2 | 2.1 | 14.4 | 262.4 |

TABLE 16

Mechanical Properties (at 80° C. mold)

| Sample | Tensile modulus (1 mm/min) (MPa) | Tensile stress (5 mm/min) (MPa) | Tensile strain (5 mm/min) (%) | Flex modulus (MPa) | Flex stress (MPa) | Flex Strain (%) | Izod Notched (kJ/m$^2$) | DTUL (° C.) |
|---|---|---|---|---|---|---|---|---|
| Control 3 | 14,337 | 181.1 | 1.8 | 13,530 | 261.7 | 2.1 | 9.9 | 268.7 |
| Control 4 | 14,345 | 182.5 | 1.8 | 13,891 | 262.3 | 2.1 | 10.2 | 267.1 |
| 13 | 15,402 | 186.7 | 1.7 | 14,522 | 278.3 | 2.1 | 9.5 | 271.4 |
| 14 | 15,205 | 184.7 | 1.7 | 14,167 | 275.7 | 2.1 | 9.4 | 274.0 |
| 15 | 14,292 | 168.4 | 1.8 | 13,410 | 243.2 | 2.1 | 7.6 | 261.3 |
| 16 | 13,914 | 154.5 | 1.6 | 13,227 | 234.7 | 2.0 | 13.9 | 266.9 |

Example 5

The components listed in Table 17 below are mixed in a Werner Pfleiderer ZSK 25 co-rotating intermeshing twin-screw extruder with a 25 mm diameter.

TABLE 17

| Sample | FORTRON® 0203 PPS (wt. %) | Compound J (wt. %) | Boron Nitride (wt. %) | Glycolube P (wt. %) | Amino-silane (wt. %) | Glass Fibers (4 mm) (wt. %) |
|---|---|---|---|---|---|---|
| Control 4 | 59.3 | — | — | 0.3 | 0.4 | 40.3 |
| 17 | 58.6 | 0.6 | 0.1 | 0.3 | 0.4 | 40.0 |

The thermal properties of pellets formed from the samples are determined, the results of which are set forth below in Table 18.

As indicated above, the addition of the aromatic amide oligomer increased the crystallization potential of the composition. The pellets are also molded into T-bars on a Mannesmann Demag D100 NCIII injection molding machine. The thermal properties are tested, the results of which are set forth below in Table 19 and Table 14.

TABLE 18

Thermal Properties of Pellets

| Sample | MV (kpoise) | Pre-Cryst Melt Temp (° C.) | Pre-Cryst Heat of Fusion (J/g) | 1$^{st}$ Heat, Melt Temp (° C.) | 1$^{st}$ Heat of Fusion (J/g) | 2$^{nd}$ Heat, Melt Temp (° C.) | 2$^{nd}$ Heat of Fusion (J/g) | Re-Cryst Temp (° C.) | Re-Cryst Heat of Fusion (J/g) | Cryst Potential (%) |
|---|---|---|---|---|---|---|---|---|---|---|
| Control 4 | 2.196 | 120.5 | 7.4 | 282.9 | 26.8 | 279.1 | 23.3 | 225.4 | 27.0 | 72.2 |
| 17 | 2.192 | 121.3 | 4.5 | 281.4 | 25.4 | 281.8 | 24.4 | 243.7 | 27.5 | 82.2 |

TABLE 19

Thermal Properties of T-bars

| Sample | Pre-Cryst Melt Temp (° C.) | Pre-Cryst Heat of Fusion (J/g) | 1$^{st}$ Heat, Melt Temp (° C.) | 1$^{st}$ Heat of Fusion (J/g) | 2$^{nd}$ Heat, Melt Temp (° C.) | 2$^{nd}$ Heat of Fusion (J/g) | Re-Cryst Temp (° C.) | Re-Cryst Heat of Fusion (J/g) | Cryst Potential (%) | Flash (mm) |
|---|---|---|---|---|---|---|---|---|---|---|
| Control 4 | 117.6 | 0.7 | 283.3 | 25.7 | 280.7 | 24.1 | 239.3 | 27.5 | 97.2 | 0.249 |
| 17 | 106.9 | 1.9 | 283.1 | 23.7 | 283.5 | 22.4 | 244.1 | 25.0 | 92.0 | 0.196 |

As indicated, the samples containing the aromatic amide oligomer (Samples 17) showed higher recrystallization temperature, indicating a faster crystallization process than Control 4. Due to the faster crystallization, the flash performance of Sample 17 is also better than Control 4. The mechanical properties are also tested, the results of which are set forth below in Table 20.

TABLE 20

Mechanical Properties

| Sample | Tensile modulus (1 mm/min) (MPa) | Tensile stress (5 mm/min) (MPa) | Tensile strain (5 mm/min) (%) | Flex modulus (MPa) | Flex stress (MPa) | Flex Strain (%) | Izod Notched (kJ/m$^2$) | DTUL (° C.) |
|---|---|---|---|---|---|---|---|---|
| Control 4 | 14,821 | 191.2 | 1.8 | 14,408 | 275.4 | 2.0 | 10.1 | 269.3 |
| 17 | 14,891 | 167.4 | 1.3 | 15,602 | 281.97 | 1.9 | 11.1 | 272.1 |

Example 6

The components listed in Table 21 below are mixed in a Werner Pfleiderer ZSK 25 co-rotating intermeshing twin-screw extruder with a 25 mm diameter.

TABLE 21

Sample Components

| Sample | FORTRON® 0203 PPS (wt. %) | Compound J (wt. %) | Compound O1 (wt. %) | Boron Nitride (wt. %) | Glycolube P (wt. %) | Amino-silane (wt. %) | Glass Fibers (4 mm) (wt. %) |
|---|---|---|---|---|---|---|---|
| Control 5 | 59.3 | | | | 0.3 | 0.4 | 40 |
| Control 6 | 59.1 | | | 0.2 | 0.3 | 0.4 | 40 |
| 18 | 58.6 | 0.6 | | 0.1 | 0.3 | 0.4 | 40 |
| 19 | 58.6 | | 0.6 | 0.1 | 0.3 | 0.4 | 40 |
| 20 | 58.6 | | 0.6 | | 0.3 | 0.4 | 40 |

The thermal properties of pellets formed from the samples are determined, the results of which are set forth below in Table 22.

TABLE 22

Thermal Properties of Pellets

| Sample | Ash content (wt. %) | Melt Viscosity (kpoise) |
|---|---|---|
| Control 5 | 41.35 | 2.397 |
| Control 6 | 40.78 | 2.237 |
| 18 | 40.89 | 2.192 |
| 19 | 40.64 | 2.111 |
| 20 | 40.80 | 1.870 |

The mechanical properties are also tested, the results of which are set forth below in Tables 23 and 24.

TABLE 23

| | Mechanical Properties (at 130° C. mold) | | | | | | | |
|---|---|---|---|---|---|---|---|---|
| Sample | Tensile modulus (1 mm/min) (MPa) | Tensile stress (5 mm/min) (MPa) | Tensile strain (5 mm/min) (%) | Flex modulus (MPa) | Flex stress (MPa) | Flex Strain (%) | Izod Notched (kJ/m$^2$) | DTUL (° C.) |
| Control 5 | 15129 | 185.33 | 1.57 | 15110 | 291.18 | 2.07 | 10 | 271.7 |
| Control 6 | 14983 | 197.53 | 1.76 | 14775 | 289.19 | 2.08 | 10.60 | 272.60 |
| 18 | 14891 | 167.43 | 1.35 | 15078 | 282.65 | 1.97 | 11.10 | 272.10 |
| 19 | 15150 | 167.80 | 1.31 | 15602 | 281.97 | 1.89 | 10.40 | 271.60 |
| 20 | 15176 | 150.46 | 1.12 | 15460 | 279.01 | 1.88 | 10.90 | 268.00 |

TABLE 24

| | Mechanical Properties (at 80° C. mold) | | | | | | | |
|---|---|---|---|---|---|---|---|---|
| Sample | Tensile modulus (1 mm/min) (MPa) | Tensile stress (5 mm/min) (MPa) | Tensile strain (5 mm/min) (%) | Flex modulus (MPa) | Flex stress (MPa) | Flex Strain (%) | Izod Notched (kJ/m$^2$) | DTUL (° C.) |
| Control 5 | 15025 | 189.58 | 1.70 | 14658 | 291.55 | 2.24 | 10.2 | 269.9 |
| Control 6 | 151.70 | 186.74 | 1.62 | 14561 | 287.36 | 2.21 | 10.20 | 270.90 |
| 18 | 14731 | 166.73 | 1.40 | 14607 | 289.43 | 2.20 | 10.50 | 270.10 |
| 19 | 15004 | 188.51 | 1.65 | 14936 | 292.33 | 2.18 | 10.60 | 270.70 |
| 20 | 14724 | 191.30 | 1.81 | 14372 | 280.22 | 2.21 | 10.60 | 272.60 |

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A method for injection molding a thermoplastic composition, the method comprising:
   injecting a thermoplastic composition into a mold cavity, wherein the thermoplastic composition comprises a polyarylene sulfide and aromatic amide oligomer;
   cooling the thermoplastic composition within the mold cavity at a mold temperature of from about 50° C. to about 120° C., wherein the normalized cooling ratio is from about 0.2 to about 8 second per millimeter; and
   ejecting the molded part from the mold cavity.

2. The method of claim 1, wherein the mold temperature is from about 70° C. to about 90° C.

3. The method of claim 1, wherein water is used as a cooling medium.

4. The method of claim 1, wherein the aromatic amide oligomer has a molecular weight of about 3,000 grams per mole or less.

5. The method of claim 1, the aromatic amide oligomer having the following general formula (I)

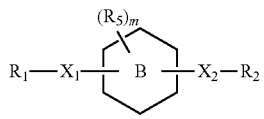

wherein,
ring B is a 6-membered aromatic ring wherein 1 to 3 ring carbon atoms are optionally replaced by nitrogen or oxygen, wherein each nitrogen is optionally oxidized, and wherein ring B may be optionally fused or linked to a 5- or 6-membered aryl, heteroaryl, cycloalkyl, or heterocyclyl;

R$_5$ is halo, haloalkyl, alkyl, alkenyl, alkynyl, aryl, heteroaryl, cycloalkyl, or heterocyclyl;

m is from 0 to 4;

X$_1$ and X$_2$ are independently C(O)HN or NHC(O); and

R$_1$ and R$_2$ are independently selected from aryl, heteroaryl, cycloalkyl, and heterocyclyl.

6. The method of claim 5, wherein ring B is phenyl.

7. The method of claim 5, wherein ring B is naphthyl.

8. The method of claim 1, wherein the aromatic amide oligomer has the following general formula (IV):

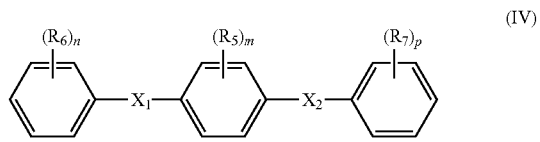

wherein, $X_1$ and $X_2$ are independently C(O)HN or NHC(O);

$R_5$, $R_6$, and $R_7$ are independently selected from halo, haloalkyl, alkyl, alkenyl, alkynyl, aryl, heteroaryl, cycloalkyl, and heterocyclyl;

m is from 0 to 4; and n and p are independently from 0 to 5.

9. The method of claim 8, wherein m, n, and p are 0.

10. The method of claim 8, wherein $R_6$ and $R_7$ are phenyl substituted with —C(O)HN— or —NHC(O)—.

11. The method of claim 1, wherein the aromatic amide oligomer has the following general formula (V):

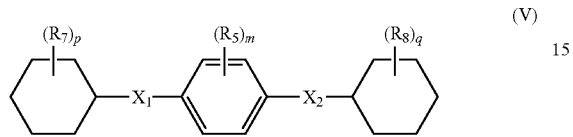
(V)

wherein, $X_1$ and $X_2$ are independently C(O)HN or NHC(O);

$R_6$, $R_7$, and $R_8$ are independently selected from halo, haloalkyl, alkyl, alkenyl, alkynyl, aryl, heteroaryl, cycloalkyl, and heterocyclyl;

m is from 0 to 4; and p and q are independently from 0 to 5.

12. The method of claim 11, wherein m is 0.

13. The method of claim 1, wherein the oligomer is selected from the group consisting of the following compounds and combinations thereof:

| Structure | Name |
| --- | --- |
| | N1,N4-diphenyl-terephthalamide |
| | N1,N4-diphenyl-isoterephthalamide |
| | N1,N4-bis(2,3,4,5,6-pentafluorophenyl)terephthalamide |
| | N1,N4-bis(4-benzamidophenyl)terephthalamide |
| | N4-phenyl-N1-[4-[[4-(phenylcarbamoyl)benzoyl]amino]phenyl]terephthalamide |

-continued

| Structure | Name |
|---|---|
| | N4-phenyl-N1-[3-[[4-(phenylcarbamoyl)benzoyl]amino]phenyl]terephthalamide |
| | N1,N3-bis(4-benzamidophenyl)benzene-1,3-dicarboxamide |
| | N3-phenyl-N1-[3-[[3-(phenylcarbamoyl)benzoyl]amino]phenyl]benzene-1,3-dicarboxamide |
| | N1,N3-bis(3-benzamidophenyl)benzene-1,3-dicarboxamide |

| Structure | Name |
|---|---|
| 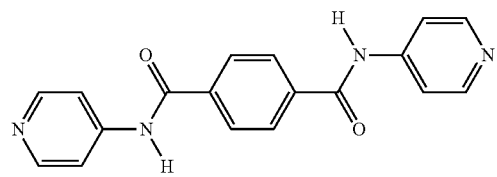 [SMILES: O=C(Nc1ccncc1)c1ccc(C(=O)Nc2ccncc2)cc1] | N1,N4-bis(4-pyridyl)terephthalamide |
| 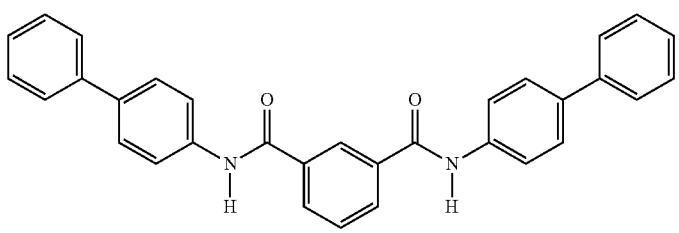 [SMILES: O=C(Nc1ccc(-c2ccccc2)cc1)c1cccc(C(=O)Nc2ccc(-c3ccccc3)cc2)c1] | N1,N3-bis(4-phenylphenyl)benzene-1,3-dicarboxamide |
| 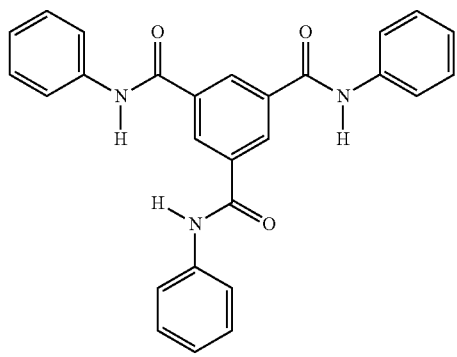 [SMILES: O=C(Nc1ccccc1)c1cc(C(=O)Nc2ccccc2)cc(C(=O)Nc2ccccc2)c1] | N1,N3,N5-triphenyl-benzene-1,3,5-tricarboxamide |
| 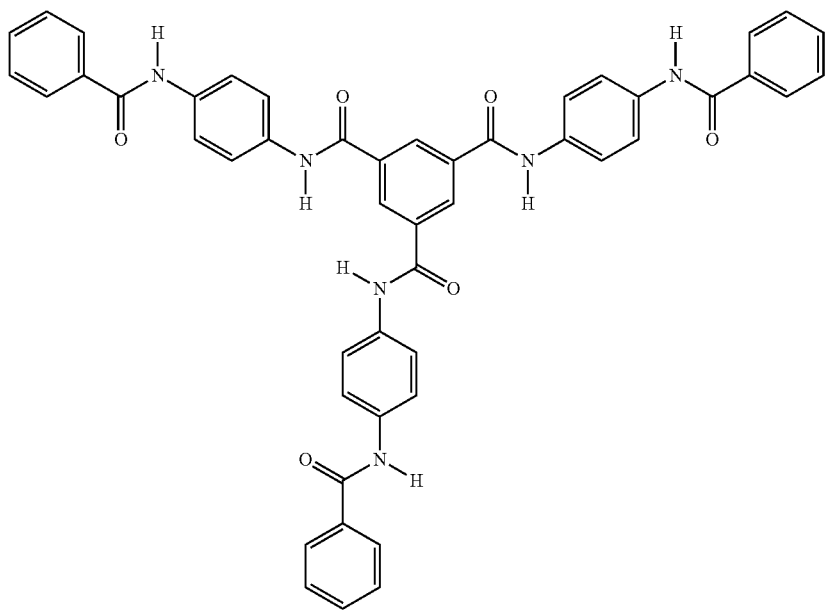 [SMILES: O=C(Nc1ccc(NC(=O)c2cc(C(=O)Nc3ccc(NC(=O)c4ccccc4)cc3)cc(C(=O)Nc3ccc(NC(=O)c4ccccc4)cc3)c2)cc1)c1ccccc1] | N1,N3,N5-tris(4-benzamidophenyl)benzene-1,3,5-tricarboxamide |

| Structure | Name |
|---|---|
| | N-(4,6-dibenzamido-1,3,5-triazin-2-yl)benzamide |
| | N2,N7-dicyclohexyl-naphthalene-2,7-dicarboxamide |
| | N2,N6-dicyclohexyl-naphthalene-2,6-dicarboxamide |
| | N1,N3,N5-tris(3-benzamidophenyl)benzene-1,3,5-tricarboxamide |
| | N,N'-dicyclohexyl-isoterephthalamide |

-continued

| Structure | Name |
|---|---|
| (chemical structure) | N,N'-dicyclohexyl-terephthalamide. |

14. The method of claim 1, wherein the oligomer is N1,N4-diphenylterephthalamide.

15. The method of claim 1, wherein aromatic amide oligomers constitute from about 0.1 wt. % to about 8 wt. % of the composition.

16. The method of claim 1, wherein the composition further comprises boron nitride, an impact modifier, mineral filler, fibrous filler, organosilane coupling agent, lubricant, disulfide, or a combination thereof.

17. The method of claim 1, wherein the composition has a crystallization potential of about 55% or more, as determined by differential scanning calorimetry in accordance with ISO 10350.

18. The method of claim 1, wherein the composition has a crystallization potential of from about 75% to about 95%, as determined by differential scanning calorimetry in accordance with ISO 10350.

19. The method of claim 1, wherein the length of flash created during the injection molding is about 0.17 millimeters or less.

20. The method of claim 1, wherein the length of flash created during the injection molding is about 0.13 millimeters or less.

21. The method of claim 1, wherein the molded part has a thickness of about 100 millimeters or less or contains a feature having a thickness of about 100 millimeters or less.

22. The method of claim 1, wherein the composition further comprises boron nitride.

* * * * *